Oct. 29, 1935.    L. Y. SPEAR ET AL    2,019,025
ELECTRIC DRIVE
Filed Oct. 22, 1932    18 Sheets-Sheet 1
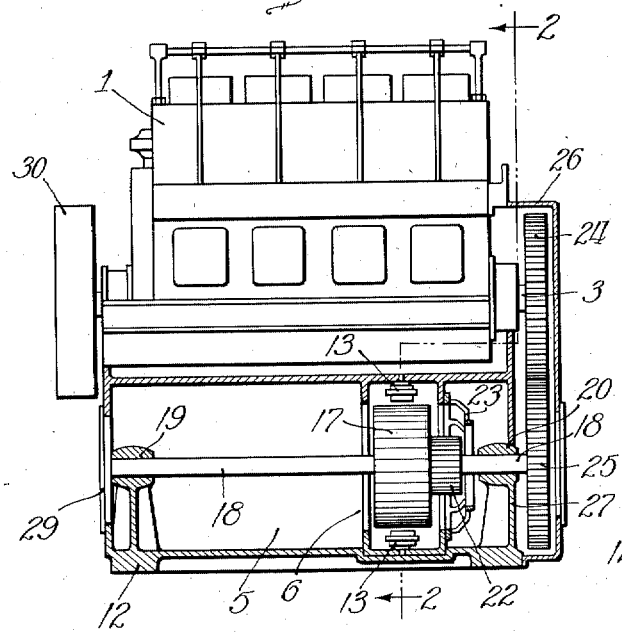
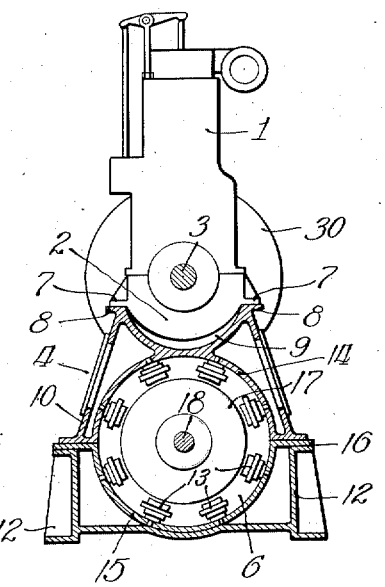
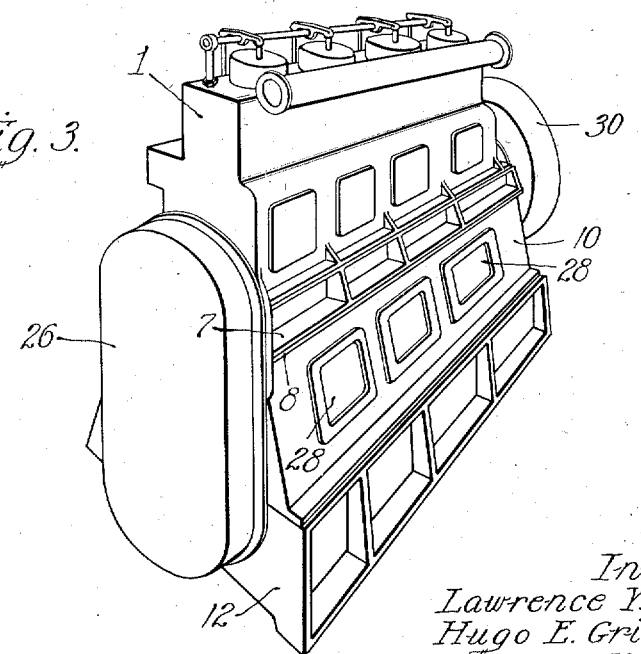
Inventors:
Lawrence Y. Spear
Hugo E. Grieshaber
Ernest Nibbs
By: Mauro Jackson Bottcher Brenner
Attys.

Oct. 29, 1935.    L. Y. SPEAR ET AL    2,019,025
ELECTRIC DRIVE
Filed Oct. 22, 1932    18 Sheets-Sheet 2
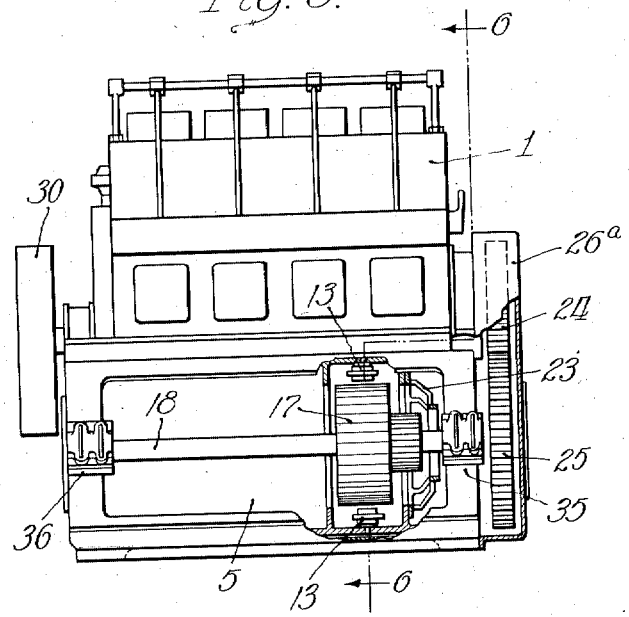
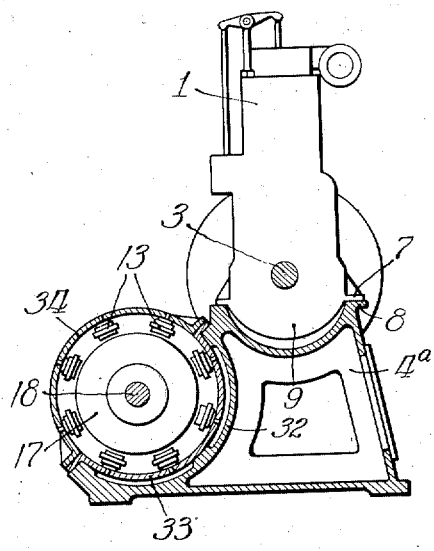
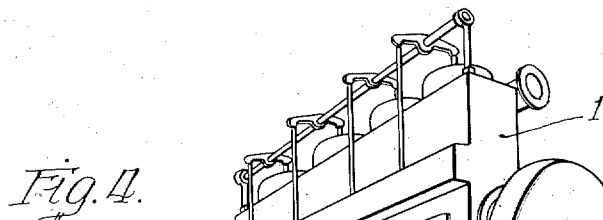
Inventors:
Lawrence Y. Spear
Hugo E. Grieshaber
Ernest Nibbs
By: *[signature]*
Attys.

Oct. 29, 1935.    L. Y. SPEAR ET AL    2,019,025
ELECTRIC DRIVE
Filed Oct. 22, 1932    18 Sheets-Sheet 3
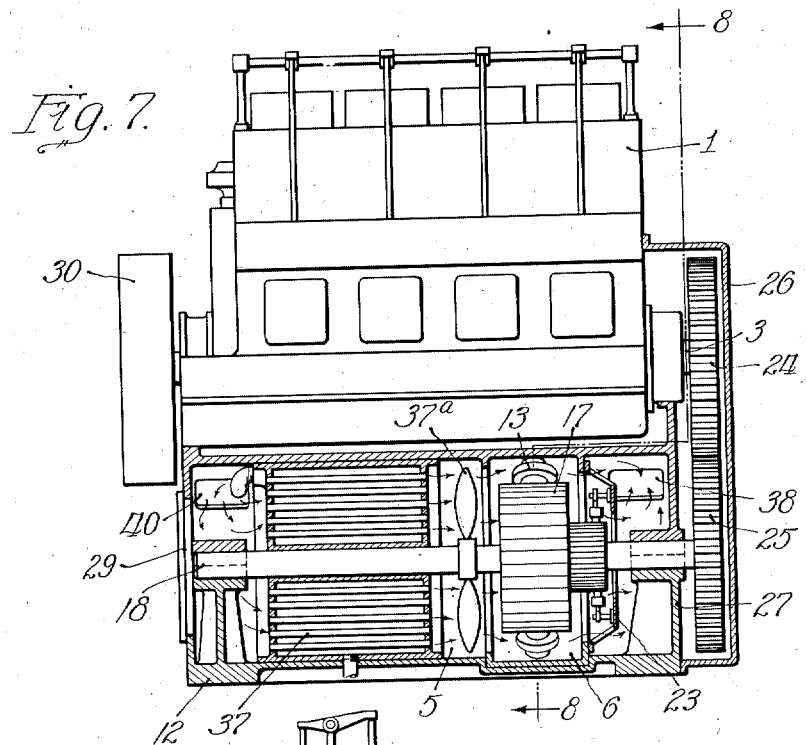
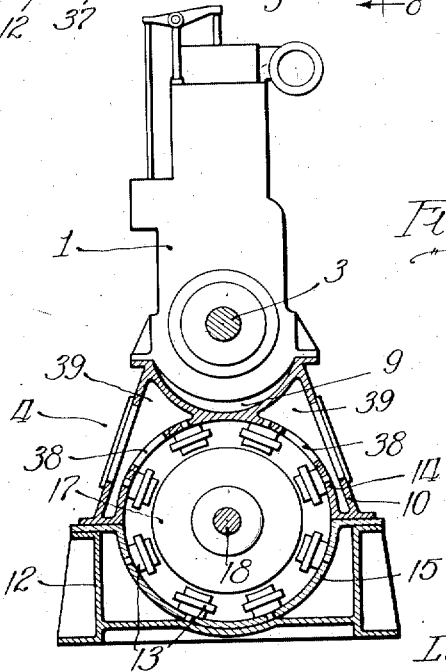
Inventors:
Lawrence Y. Spear
Hugo E. Grieshaber
Ernest Nibbs
By: *[signature]*
Attys.

Oct. 29, 1935.  L. Y. SPEAR ET AL  2,019,025
ELECTRIC DRIVE
Filed Oct. 22, 1932  18 Sheets-Sheet 4

Inventors:
Lawrence Y. Spear
Hugo E. Grieshaber
Ernest Nibbs
By: Attys.

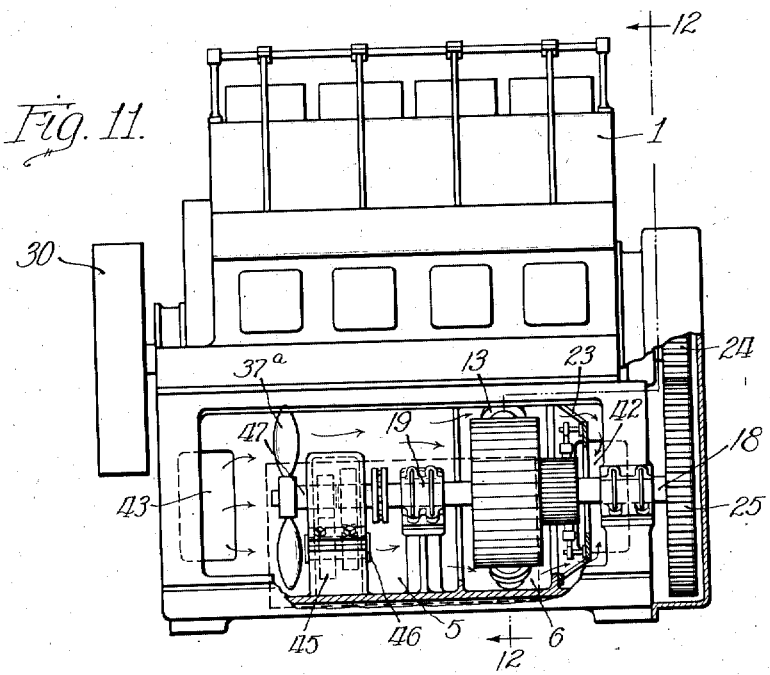

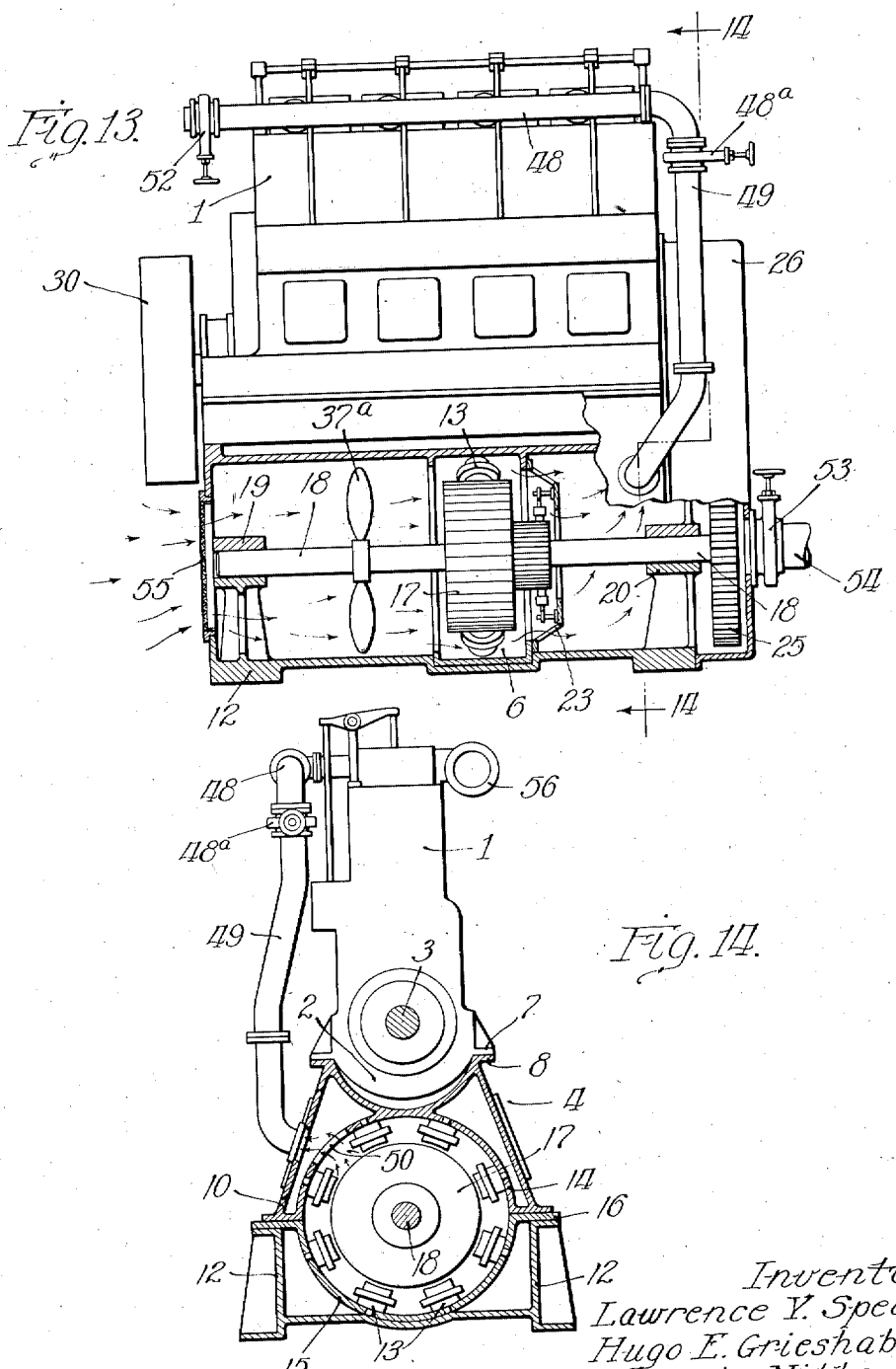

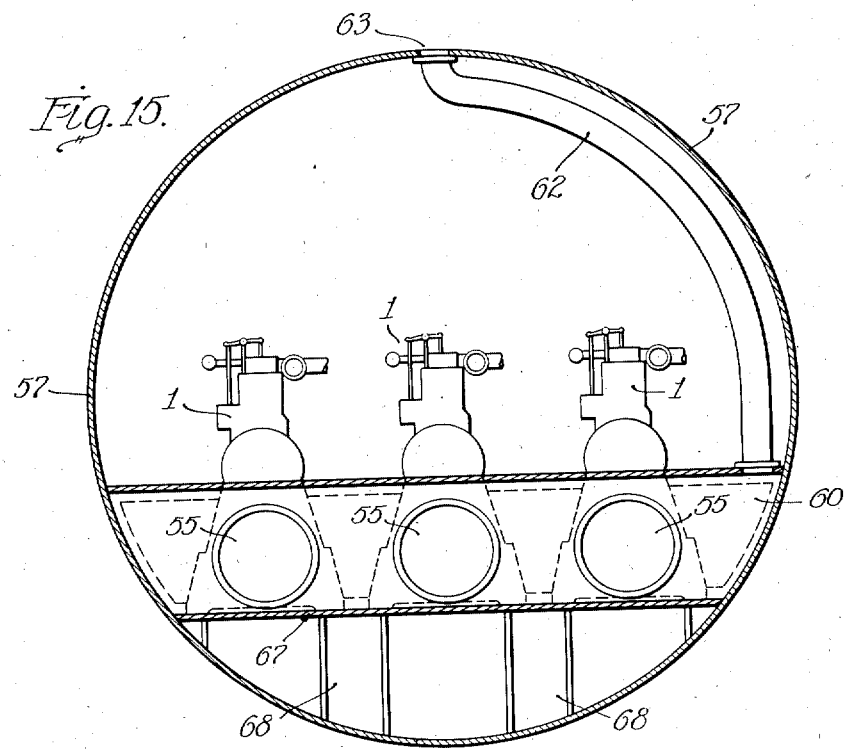
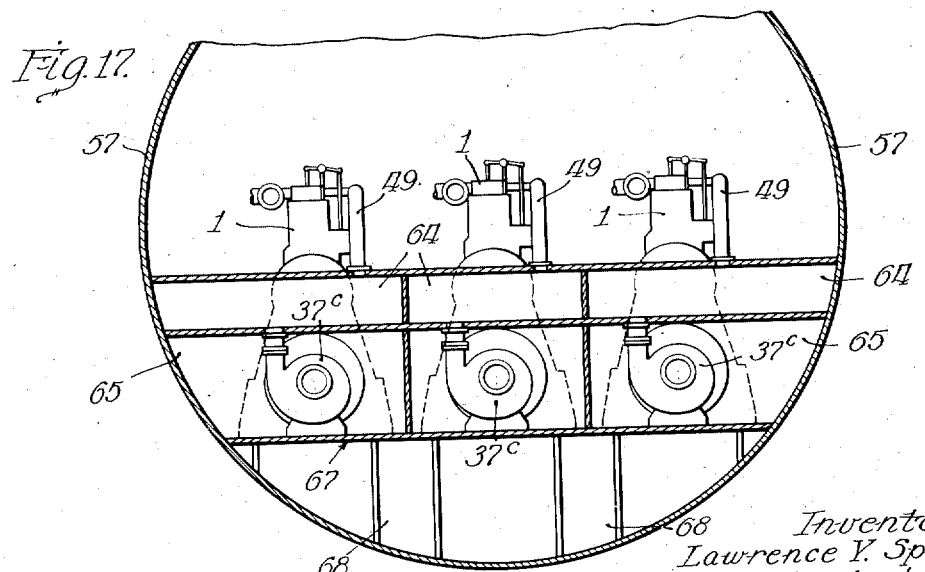

Oct. 29, 1935.  L. Y. SPEAR ET AL  2,019,025
ELECTRIC DRIVE
Filed Oct. 22, 1932   18 Sheets-Sheet 8
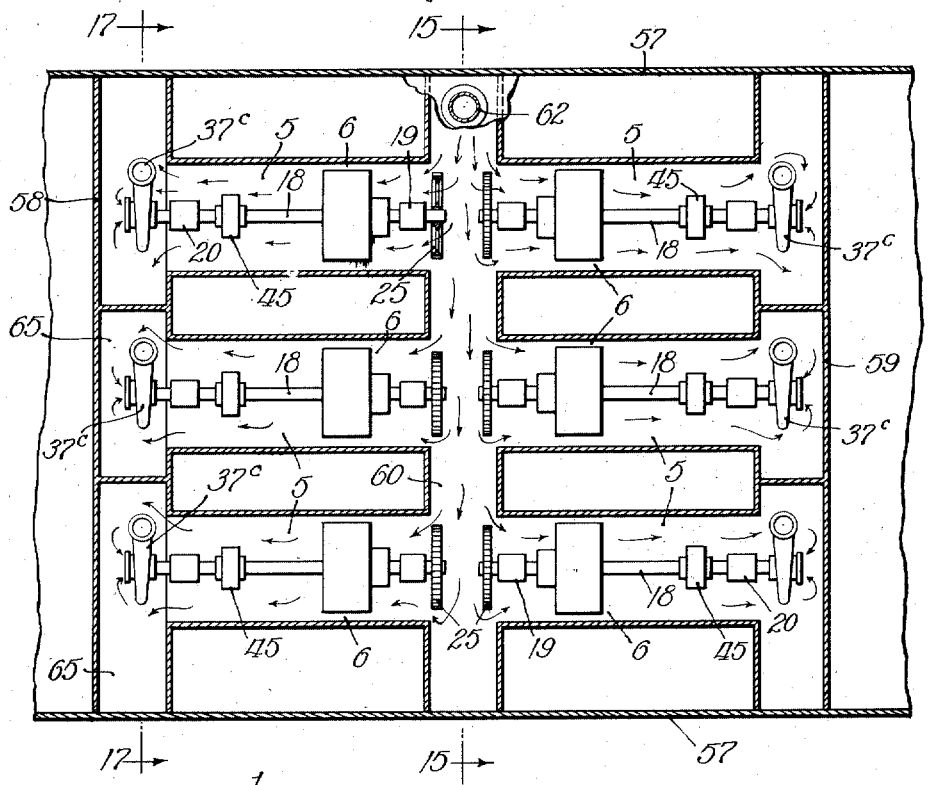
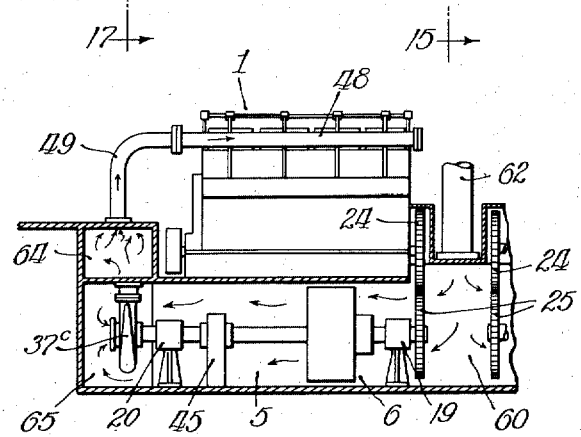
Inventors:
Lawrence Y. Spear
Hugo E. Grieshaber
Ernest Nibbs
By:
Attys.

Oct. 29, 1935.  L. Y. SPEAR ET AL  2,019,025
ELECTRIC DRIVE
Filed Oct. 22, 1932   18 Sheets-Sheet 9

Inventors:
Lawrence Y. Spear
Hugo E. Grieshaber
Ernest Nibbs
By:
Attys.

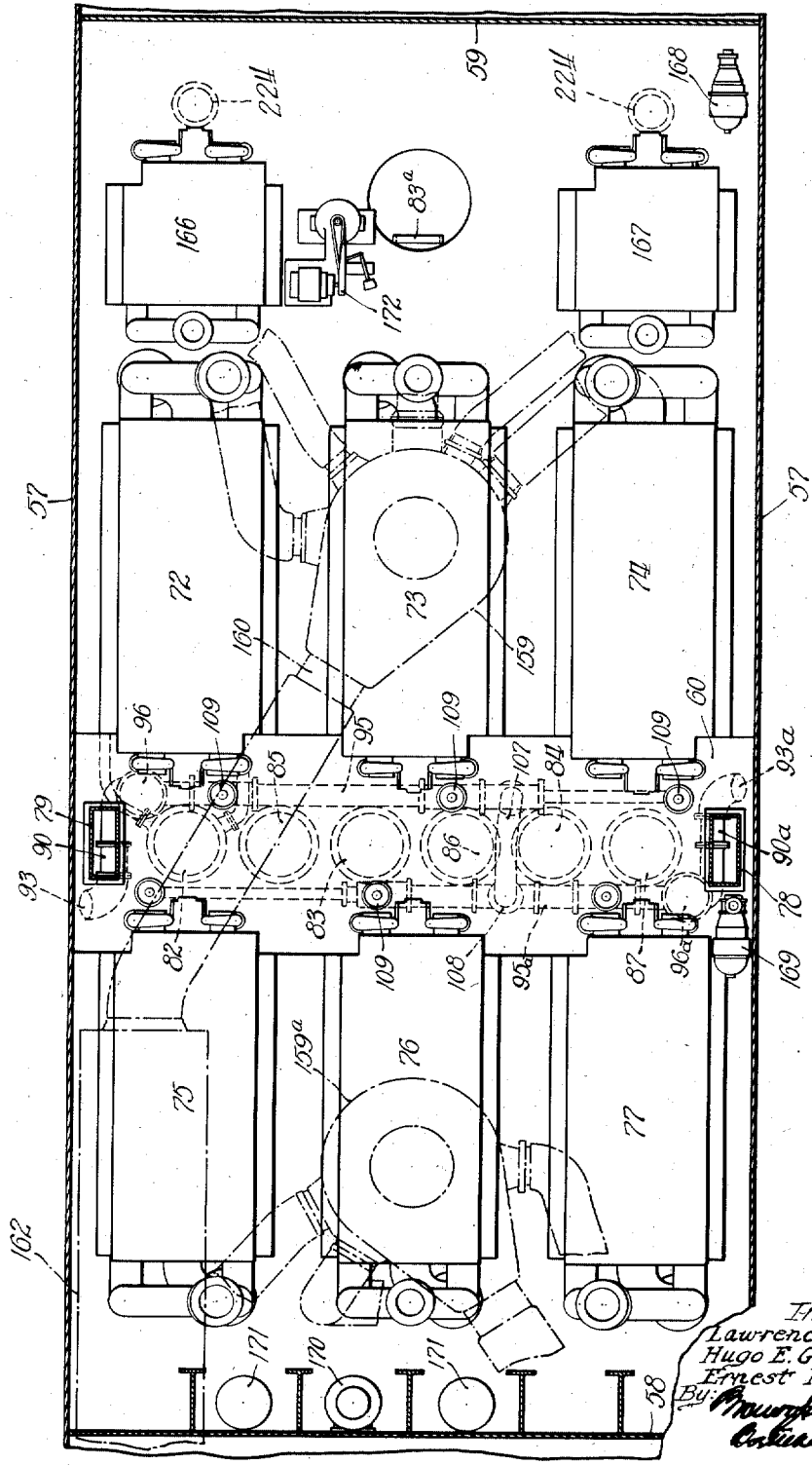

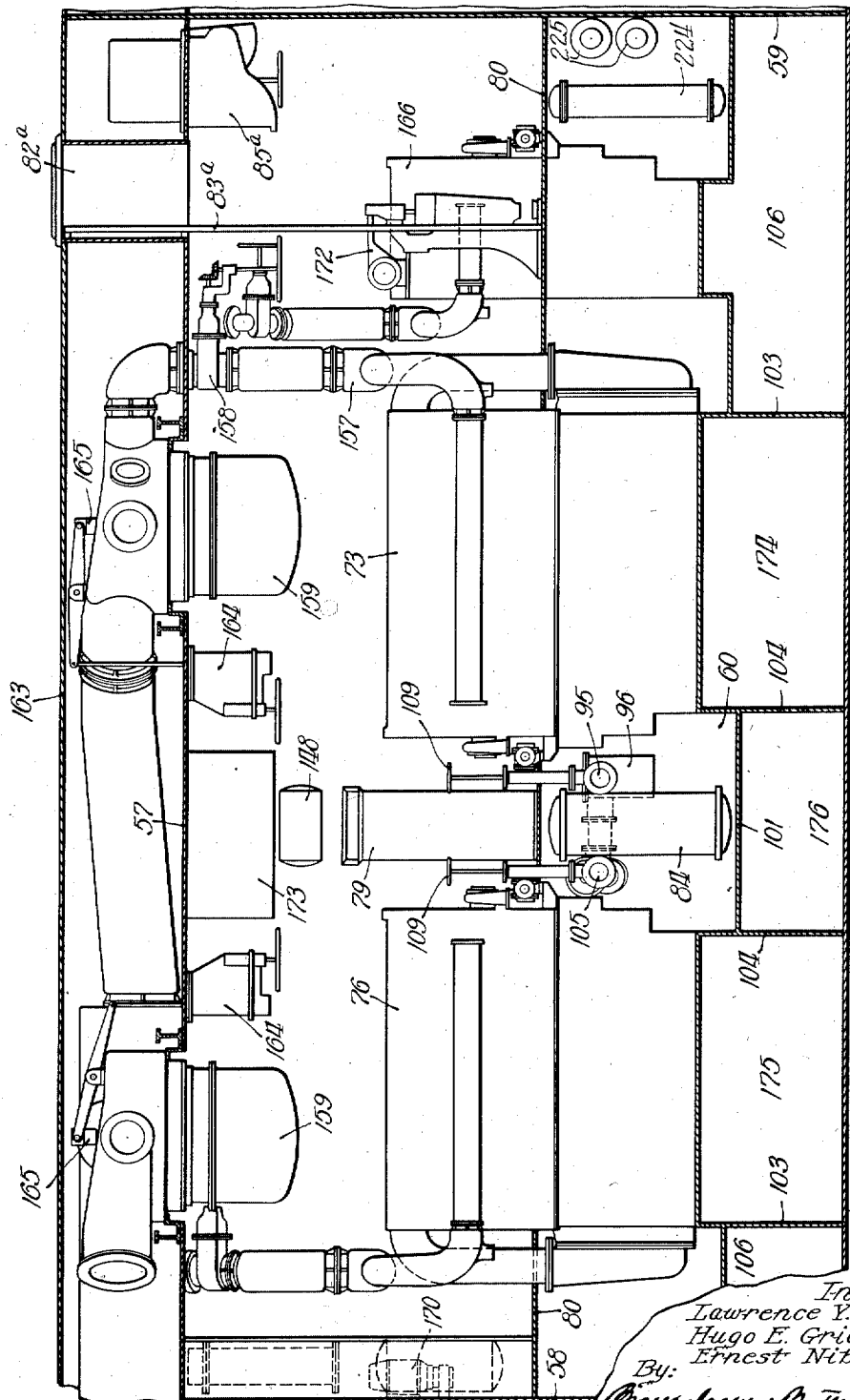

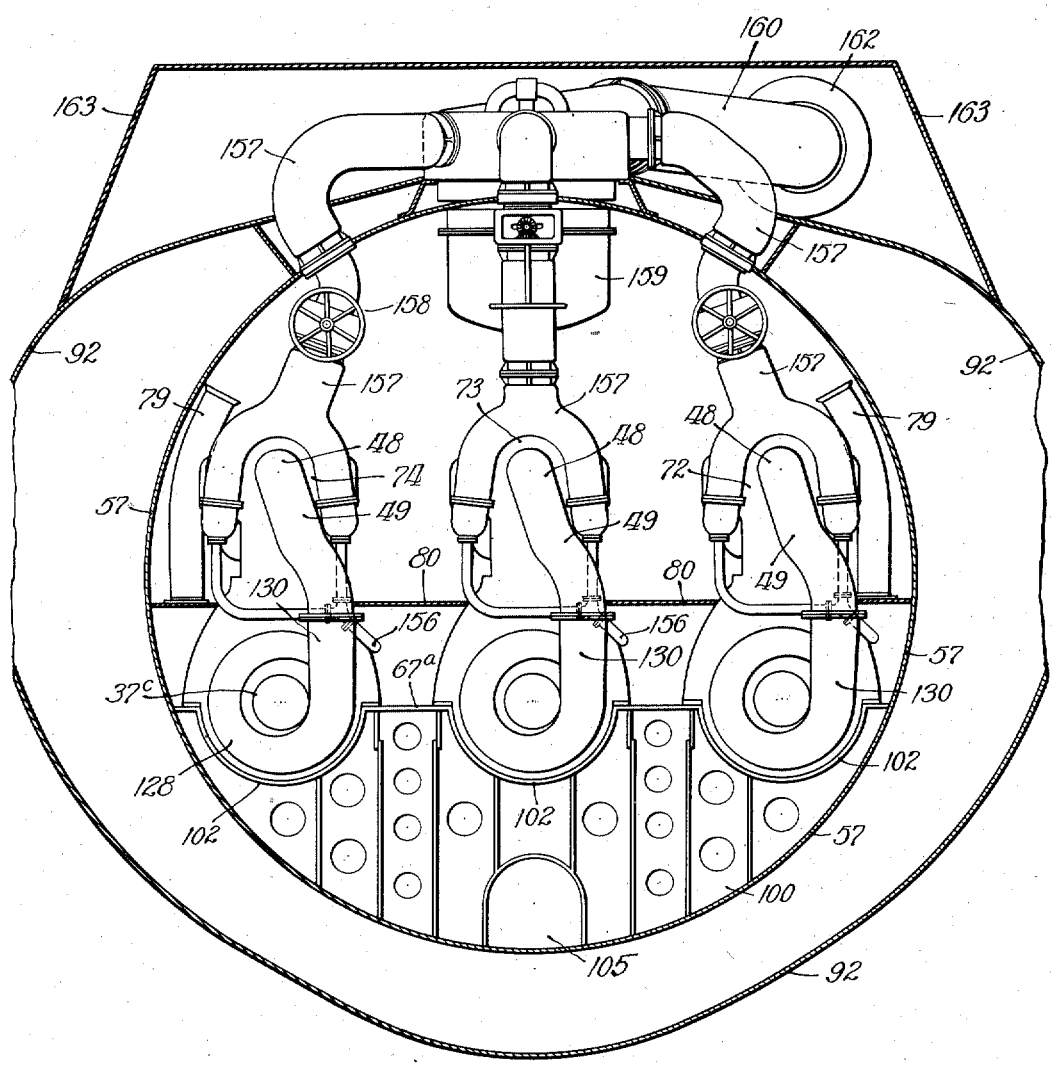

Oct. 29, 1935.  L. Y. SPEAR ET AL  2,019,025
ELECTRIC DRIVE
Filed Oct. 22, 1932      18 Sheets-Sheet 13
Fig. 24.
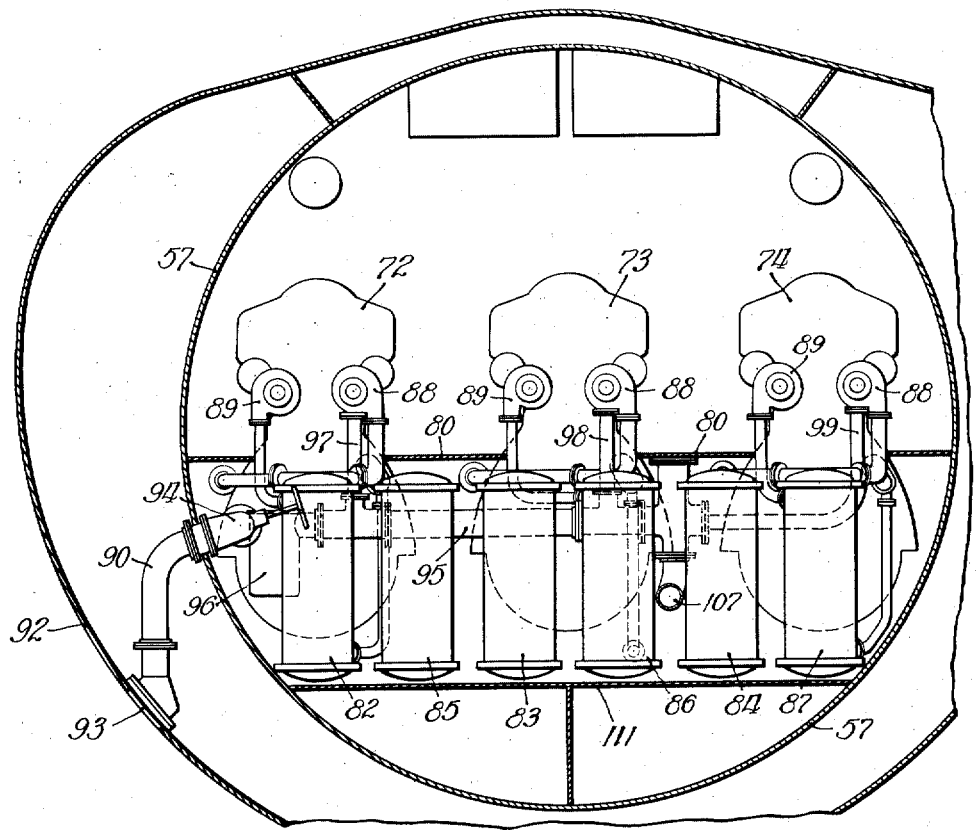
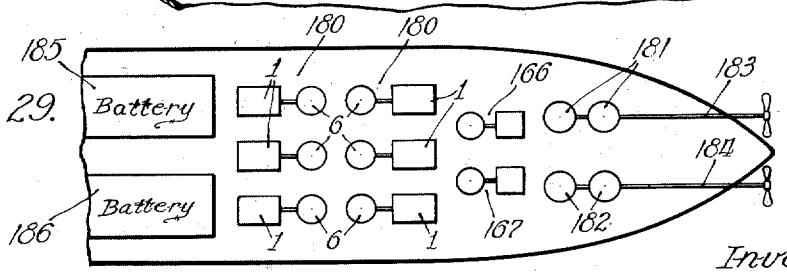
Fig. 29.
Inventors:
Lawrence Y. Spear
Hugo E. Grieshaber
Ernest Nibbs
By:
Attys.

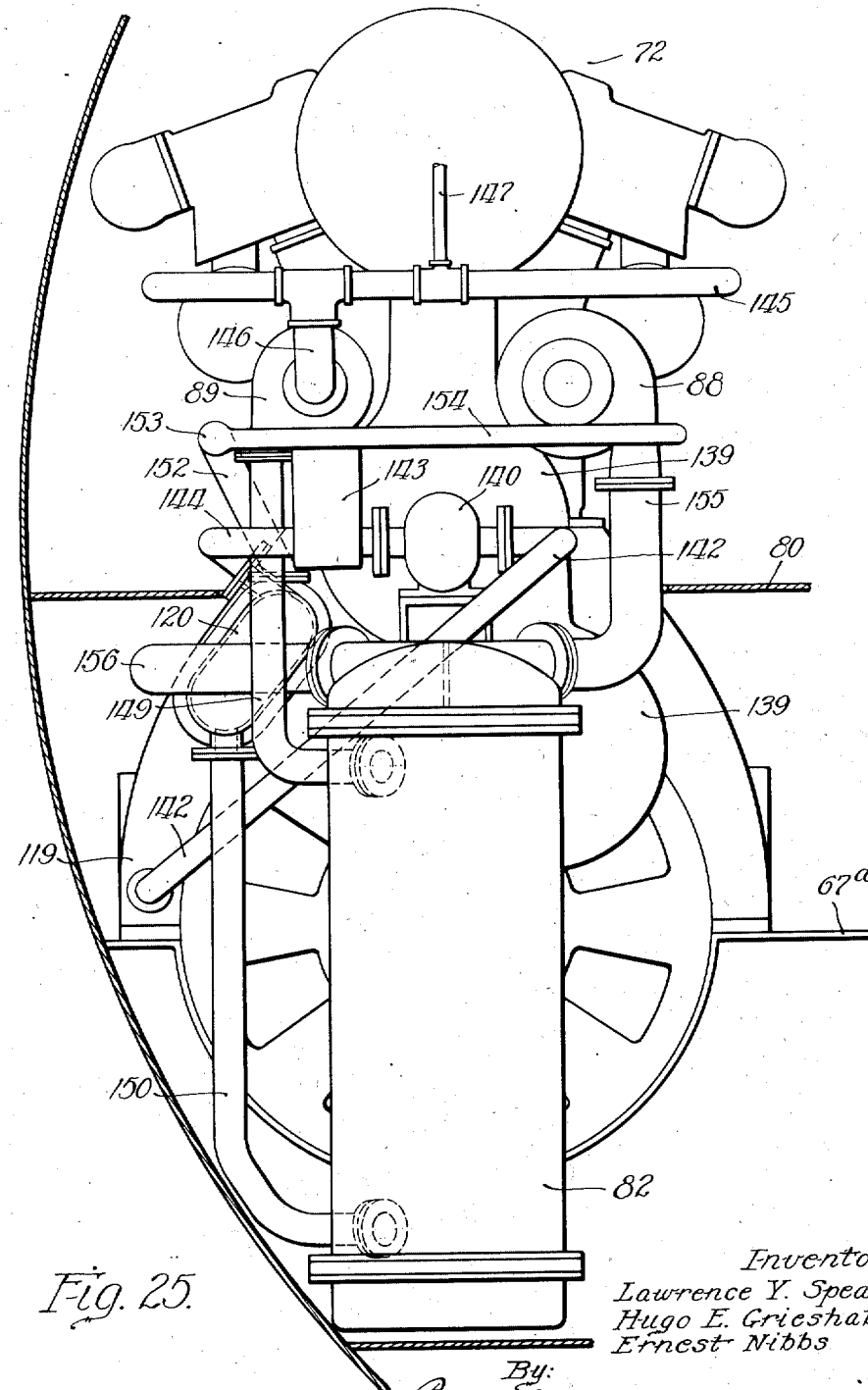

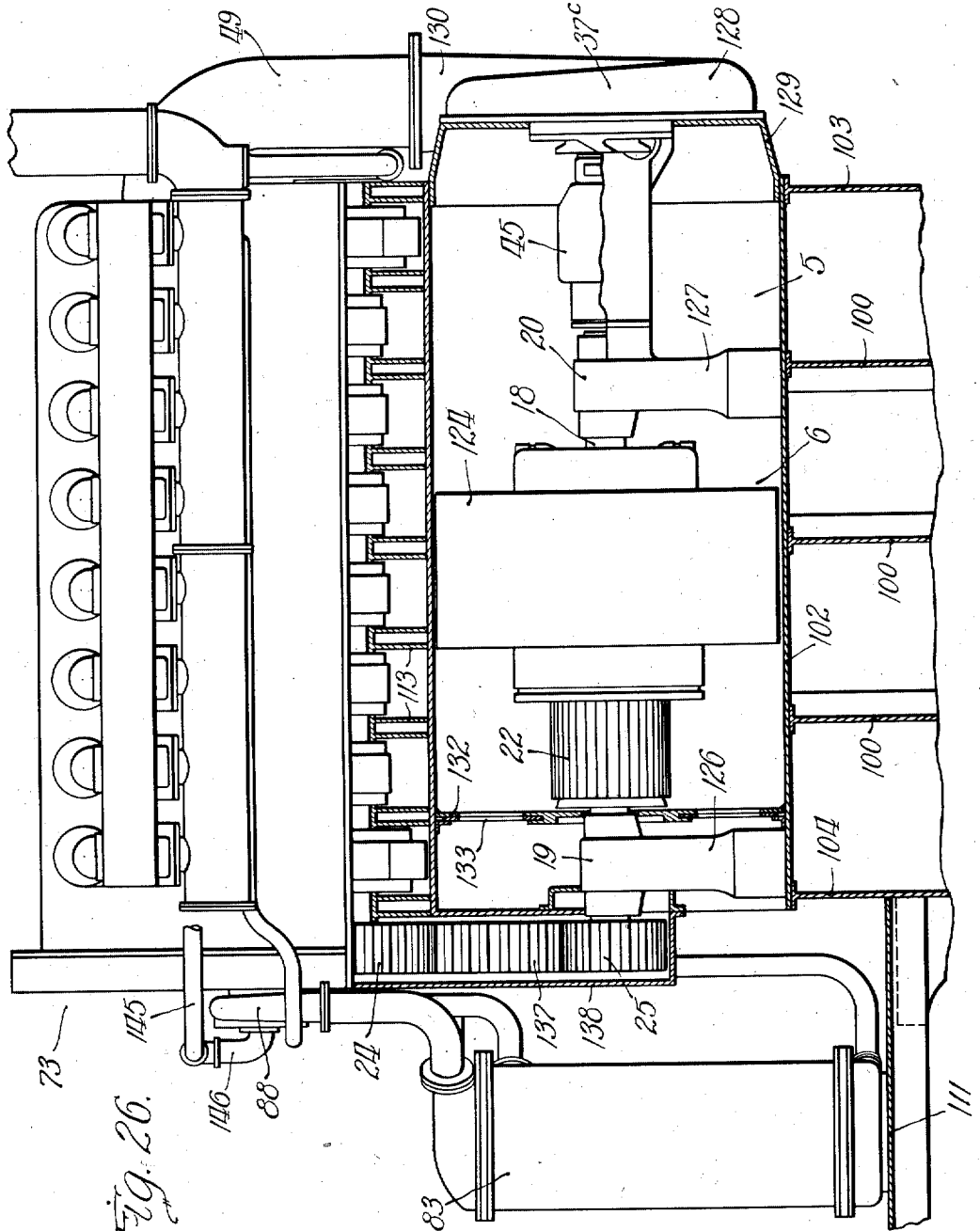

Oct. 29, 1935.  L. Y. SPEAR ET AL  2,019,025
ELECTRIC DRIVE
Filed Oct. 22, 1932   18 Sheets-Sheet 16
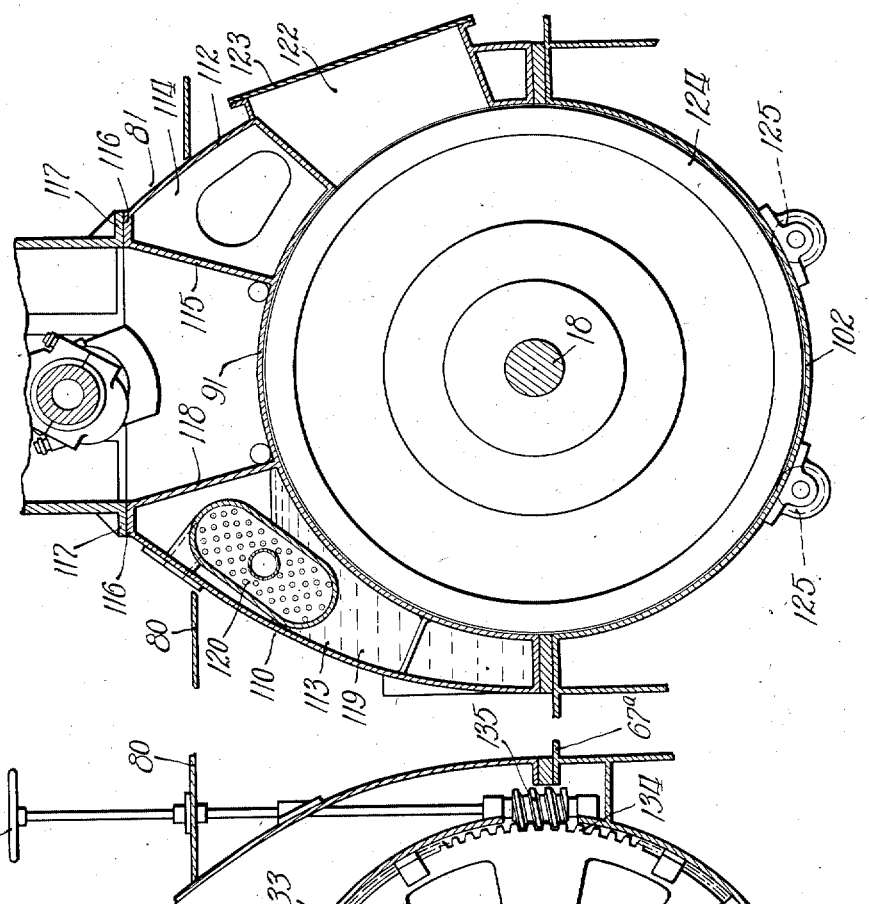
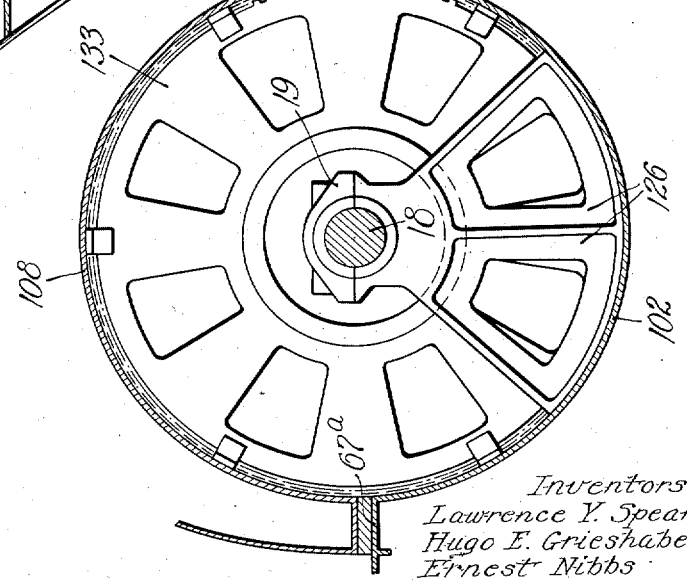
Inventors:
Lawrence Y. Spear
Hugo E. Grieshaber
Ernest Nibbs
By:
Attys

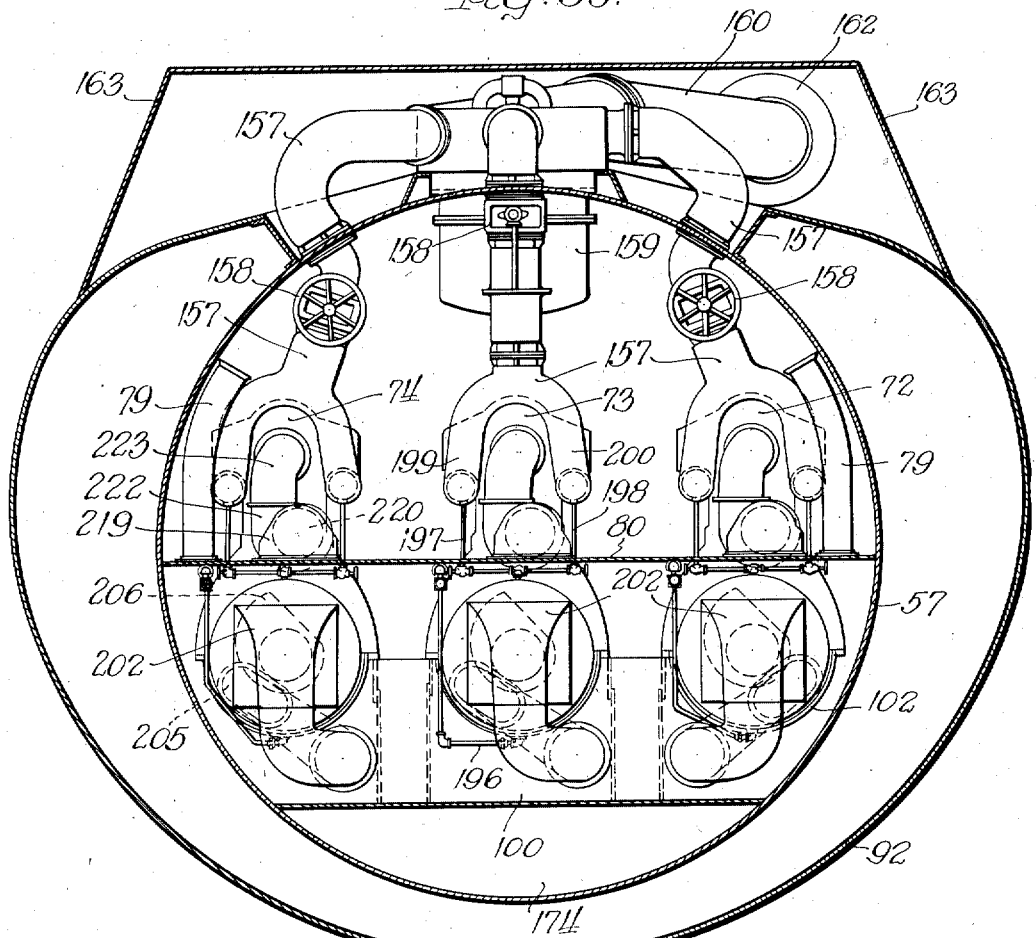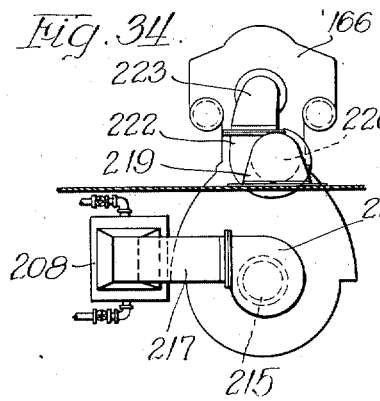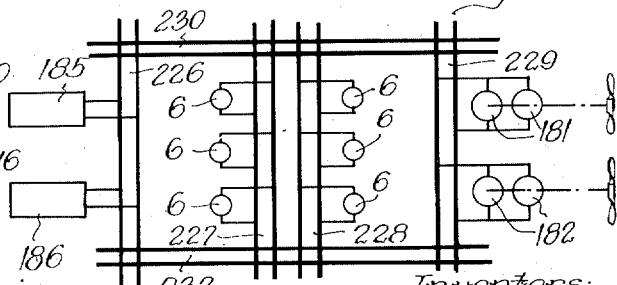

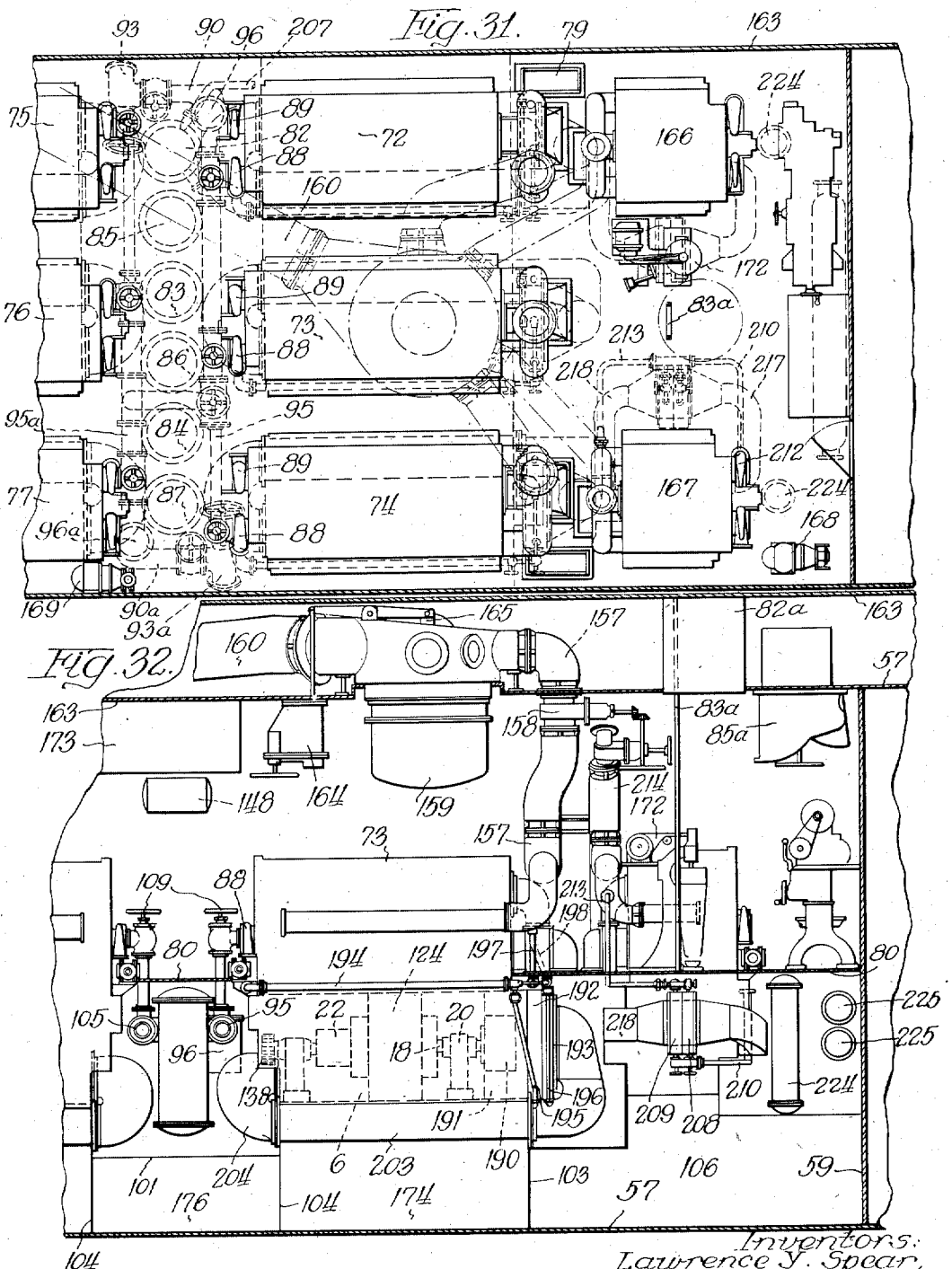

Patented Oct. 29, 1935

2,019,025

UNITED STATES PATENT OFFICE 2,019,025

ELECTRIC DRIVE

Lawrence Y. Spear, Hugo E. Grieshaber, and Ernest Nibbs, New London, Conn., assignors to Electric Boat Company, Groton, Conn., a corporation of New Jersey Application October 22, 1932, Serial No. 639,120

49 Claims. (Cl. 114—16)

Our invention relates to the propulsion of submarines and the like. While the specific forms of the invention herein disclosed are particularly applicable to submarines, we wish it understood that the invention is not to be considered as limited to that specific use, but is applicable to other uses or situations.

In submarine propulsion two distinctly different conditions of operation are encountered, namely, surface propulsion and under-surface propulsion. The latter requires that communication with atmospheric air be cut off, and propulsion be by storage battery. To recharge the battery the engines are operated when the craft is on the surface, either remaining stationary or being simultaneously propelled.

The operation of the propellers directly from the engines according to known practice provides a drive of good mechanical efficiency, but it imposes severe limitations on space and design requirements. We have conceived the desirability of mechanically separating the propeller shaft or shafts from the prime movers for both conditions of propulsion and propelling the craft at all times electrically.

We are aware that it is old in surface ship propulsion to employ an electric drive connection between the prime movers and the propeller shaft, but such systems as are in present day use are not applicable, except in part, to submarine propulsion.

According to the present invention we use as prime movers known high efficiency types of internal combustion engines, preferably, but not necessarily, injection engines—for example, Diesel engines, structurally modified and adapted as will be herein described, to combine the same with electric generators, thereby forming compact, powerful units. We do not concentrate the entire prime mover plant in a single engine, or an engine for each propeller, but provide a plurality of engine-generator units so constructed and disposed as to permit most advantageous utilization of space and flexibility of connection and control.

By subdivision of the power plant, as herein done, there are a number of advantages, among which are: space is better utilized; weight is reduced; greater reliability is secured; the system is more flexible; greater efficiency of the units is possible; the units are easier to start, etc.

The primary object of the present invention is to provide an all-electric drive suitable for submarine propulsion. In furtherance of that object the present invention aims to provide the shortest possible engine room in a submarine consistent with other important requirements of construction and operation.

In the attainment of this and other objects, an important and fundamental feature of our invention resides in the construction of the combined engine-generator units. We preferably superpose the engine upon the generator to gain floor space without excessive increase in headroom. The engines may be of any preferred or desired type, that is, for example, two or four cycle, single or double acting, and with any desired arrangement of cylinders. It is not essential that the engine be directly vertically above the generator for accomplishing certain of the advantages of our invention, but the arrangement which we herein disclose makes the power unit narrow and somewhat tall, but well within the limits of the hull construction and of a form suitable for the space devoted to such units.

The invention is not necessarily restricted to a specific form of electric generator, as the specific design of electric generators may be widely varied without departing from our invention.

The disposal of the generator shaft below and parallel to the engine shaft permits of a certain flexibility of design of the two parts. Also, it permits the connection of the two shafts by gear ratios which may be suitably selected so that the generators may be driven at a speed higher than the speed of the prime mover shaft, and hence may be made more compact and lighter in weight.

Instead of gears, other forms of connections such as chain, or multiple belt drives or the like, suitable for providing the desired drive ratio independently of the distance between the shafts, may be employed. This freedom of generator speed simplifies also the problem of forced ventilation of the generators, later to be mentioned.

Another important object of our invention is to provide simple and efficient means for controlling the temperature rise of the generators. As it is desirable to make the generators compact, and in view of the enclosed nature of the same under, or at the base of the engine, the unavoidable development of heat by current flow ($I^2R$) presents an unavoidable problem of ventilating or cooling. It is to be realized that if atmospheric air is used for cooling, such air can be secured only through means which must be sealed off effectively upon submerging. A closed circuit of cooling air passing through a heat exchanger in thermal contact with cooling water may be used.

As a means for obtaining this and other objects, the generator cooling devices and fluid passageways are combined, so far as possible, with the frame and hull structure of the vessel and/or the frames of the power units.

A further optional object is to employ, if desired, the air which cools the generators for supporting combustion in the engines. The air may be delivered to the intake passageways of the engines at a pressure suitable to scavenge and supercharge the same.

Another important object of the invention is to reduce the weight of the power plant, associated parts and accessories, to a minimum. As a means of accomplishing this object and other objects we employ, wherever possible, structural parts in a dual capacity for meeting the various structural and functional requirements of the power plant and the containing hull.

Notable features in this connection are the employment of the engine base as a housing for the generator and as a generator tunnel, utilizing the foundations of the units as oil storage space; the utilization of the lower plates of the supporting frame as a cradle for the angularly adjustable generator frame; the employment of the space between floor plates and frame plates as an air passage; the employment of the space under the power units for oil storage, or the like, etc.

Another important object of our invention is that it makes possible utilization of a suitable system of electrical control for interconnecting the engine-generator units in various combinations with each other, the driving motors, and the storage batteries, and vice versa. Due to the employment of a plurality of engine-generator units—for example, six, in the design herein shown—the capacity of each unit is relatively small compared to the total capacity of the power plant. Hence, the speeds at which the vessel may be driven may be widely varied, all at high overall efficiency, because each connected engine-generator unit may be operated at full speed, or at the most efficient speed, in producing the various speeds at which the motors are operated.

Hence, an unusual degree of flexibility, and consistently high efficiency over a wide range of speeds, is readily obtainable. At the same time, disability of any engine or generator cuts down the total power by only a minor fraction. Also, due to the independence of the generators from the propeller shafts, these generators are now available independently as starting motors for the engines, thereby securing an additional and highly desirable mode of starting the prime movers, all without additional equipment. All of the units may be serving the propulsion motors or a part may be simultaneously serving to charge the battery, which may also be independently charged when the vessel is not under way.

Other and incidental objects and advantages of the present invention will become apparent from the following detailed description, and the appended claims.

Now, in order to acquaint those skilled in the art with the manner of constructing and operating a device embodying our invention, we shall describe, in conjunction with the accompanying drawings, an embodiment of the invention.

In the drawings:

Figure 1 is a side elevational view, partly in section, of an embodiment of one phase of our invention in simple elementary form;

Figure 2 is a cross sectional view of the same, taken on line 2—2 of Figure 1;

Figure 3 is a perspective view of the device shown in Figures 1 and 2;

Figure 4 is a perspective view of a modified embodiment of the invention in which the engine is disposed above and offset laterally with respect to the generator;

Figure 5 is a side view of the same, with parts of the generator housing tunnel broken away;

Figure 6 is a cross sectional view taken on the line 6—6 of Figure 5;

Figure 7 is a side view, partly in section of another embodiment;

Figure 8 is a vertical cross section taken on the line 8—8 of Figure 7;

Figure 11 is a side elevation, with parts broken away, of another embodiment;

Figure 12 is a vertical cross section taken on the line 12—12 of Figure 11;

Figure 13 is a side elevational view with the generator tunnel in section showing a modified arrangement of the engine-generator unit;

Figure 14 is a vertical cross sectional view of the same, taken on the line 14—14 of Figure 13;

Figure 15 is a transverse cross sectional view through a submarine hull, illustrating the disposition of a plurality of units in the engine room, this section being taken on the line 15—15 of Figure 16;

Figure 16 is a horizontal section through the hull shown in Figure 15;

Figure 17 is a cross sectional view taken on the line 17—17 of Figure 16;

Figure 18:
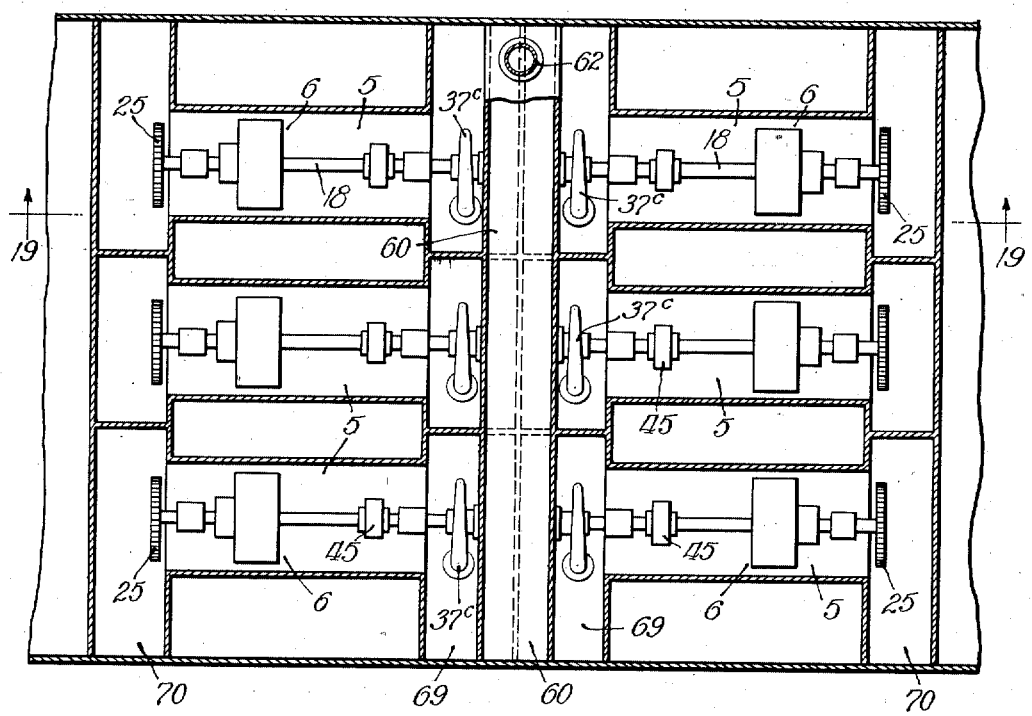
Figure 19:
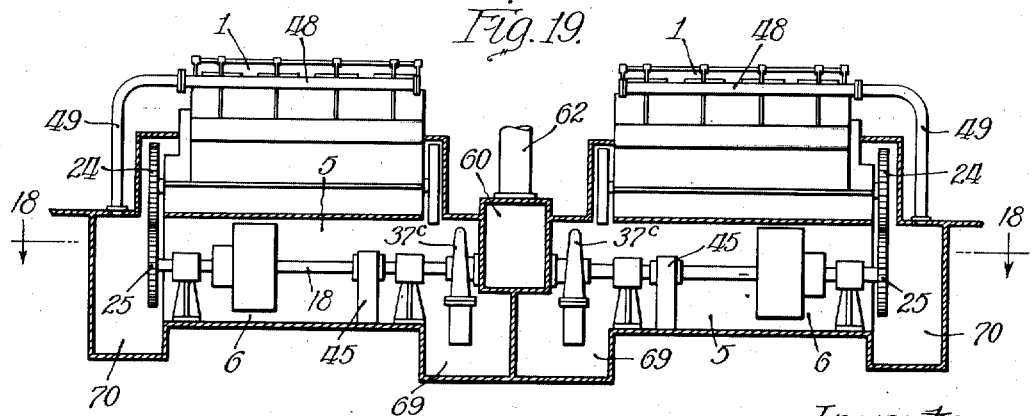

Figures 18 and 19 show a modified form of layout of the engine room, Figure 18 being a horizontal section taken on the line 18—18 of Figure 19, and Figure 19 being a vertical section taken on the line 19—19 of Figure 18;

Figure 20 is a vertical longitudinal sectional view through a unit employed in the structure shown in Figures 16 and 17;

Figure 21 is a plan view of the engine room of a submarine embodying our invention;

Figure 22 is a median longitudinal vertical section of the engine room shown in Figure 21;

Figure 23 is a cross sectional view showing the three forward main engine units, in elevation, looking aft;

Figure 24 is a similar vertical cross sectional view showing the forward engine units, in elevation, looking forward;

Figure 25 is an enlarged end elevational view of the left-hand engine unit and its auxiliary apparatus, shown in Fig. 24;

Figure 26 is a longitudinal vertical section through the engine unit shown in Figure 25;

Figure 27 is a fragmentary cross sectional view through the engine unit shown in Figure 26 to illustrate the engine frame and crank case construction and showing, also, the mounting of the shiftable generator field in the generator tunnel;

Figure 28 is a similar fragmentary sectional view illustrating the air valve or register for controlling the air flow through the corresponding generator tunnel;

Figure 29 is a diagram of the drive system showing the batteries, engine-generator units, both main and auxiliary, and the propelling motors;

Figure 30 is a general simplified diagram of the main power circuits suitable for the present scheme of propulsion;

Figure 31 is a top plan view of an embodiment of the invention employing closed circuit cooling for the generators;

Figure 32 is a vertical longitudinal section of the same;

Figure 33 is a vertical cross sectional view, looking aft, of the form shown in Figures 31 and 32; and Figure 34 is an end elevation of one auxiliary generating set, looking forward.

Figures 1 to 21, inclusive, show progressive developments of the invention which is shown in the subsequent Figures 22 to 33, as a complete working layout suitable for installation in a submarine. Figures 22 to 28 show an embodiment in which the air for cooling the generator is employed to support combustion, and Figures 31 to 34 show a form of the invention wherein the cooling air moves in a closed circuit.

It is to be noted that there are a number of inescapable requirements which explain the character of certain features of the invention, in the forms herein shown, which might otherwise be treated with greater freedom. For example, the greater length of crank shaft than generator shaft is largely due to the fact that for balanced engine operation four or more crank throws are employed to gain a substantially balanced engine. This results in a length of crank shaft which is greater than the necessary length of the generator shaft.

Also, it is to be noted that since this system of propulsion involves the use of storage batteries for under-surface operation, direct current is employed. In the forms which we have illustrated it is considered advisable to employ a storage battery of relatively large capacity, and in the preferred design we employ one or more groups of approximately 120 lead acid battery cells in series, giving a nominal voltage of approximately 240 volts. In order to charge the battery the generator must have a higher voltage, for example, 325, and this controls to a large degree the character of the generator, for each generator is made with a voltage suitable to charge the storage batteries. This explains, in some degree, the reason for certain proportions appearing in the embodiments which we have selected to illustrate our invention, but we wish it distinctly understood that while we have illustrated the construction of certain preferred forms, with certain working requirements in mind, in such installations as the working requirements may be modified the embodiments of the invention are to be freed from the limitations imposed by such requirements, and within the same requirements, it is to be understood, modifications of our invention are contemplated.

Referring first to Figures 1, 2 and 3, we have shown therein a prime mover 1 which is a four cylinder engine of the injection type, of known or preferred construction. This engine has a frame including the crank case 2 providing bearings for the crank shaft 3. The engine frame is supported upon a base 4, which base 4 constitutes a hollow frame providing a generator tunnel 5 in which there is disposed a generator 6.

As herein illustrated, the crank case 2 of the engine has a longitudinally extending flange 7 at each side, these flanges in turn resting upon cooperating flanges 8 on the base frame 4, a depression in the upper part of the base frame at 9 providing clearance for the bottom of the crank case 2. Obviously, this manner of mounting the engine upon the hollow frame which constitutes the housing for the generator may be widely varied in detail, as will appear later. The base frame 4 is split horizontally into two main parts, 10 and 12, provided with suitable longitudinally extending flanges for clamping the parts together. The frame of the generator which supports the field coils 13 may be made integral with the parts of the base frame 4, or it may be made of separate parts. We have herein shown the upper half 14 of the generator frame as formed integral with the base portion 10, and the lower half of the generator frame as made of a separate member 15, provided with flanges 16—16 interposed between the flanges of the top—bottom portions 10—12, respectively, of the base frame 4. The armature 17 of the generator 6 is mounted on a shaft 18 which has bearings 19 and 20 formed integrally or otherwise rigidly with the base frame portion 12. Suitable brush rigging 23 for the commutator 22 is mounted upon stationary parts of the frame 4. The crank shaft 3 and generator shaft 18 are geared together by a set of gears 24—25, respectively, these gears being of any suitable character, such, for example, as spur gears or herringbone gears, or may consist of a multiple V-belt drive, sprockets and chain, or any other preferred connection, which we broadly designate by the term "driving gear". The gear arrangement may be modified as by the interposition of an idler between the gear and pinion, and the gear ratio is governed by the selection of the diameters of the gears, pulleys or sprockets, all as is well known to those skilled in the art. By this parallel relation of prime mover shaft and generator shaft a compact unit of minimum axial length is provided, and the speed of the generator shaft may be suitably selected by design of the driving gear.

The gears 24 and 25 in this case are housed in a housing 26 which may be removable. This housing cooperates with a wall 27 at the end of the generator tunnel to provide a lubricant tight chamber for the gears. The sides of the base section 10 are provided with inspection openings 28, as shown in Figures 2 and 3, such openings on each side being provided with removable doors permitting access to the interior of the generator tunnel. Likewise, the end of the tunnel may be opened by removal of the door or cover 29. The frame 4 constitutes an extension of the engine frame to the foundation for the unit, and in this case the said frame is arched over the generator or saddled upon the same by direct vertical superposition. The fly wheel 30 of the engine is disposed at the opposite end of the crank shaft 3 from the gear 24.

In Figures 4, 5 and 6 we have illustrated an embodiment in which the generator is disposed at the base of the engine, but at one side of the same. The base 4a supports the engine 1 in a manner substantially as above described in connection with Figures 1, 2 and 3, but the generator and its tunnel are disposed at one side of said base 4a. The said base has a semi-cylindrical portion 32 adapted to receive the bottom half 33 of the generator frame. The top half 34 of the generator frame is extended to form a semi-cylindrical flanged cover for the generator tunnel. The joint between the cover 34 and the base portion 32 is disposed in a plane which is at substantially 45 degrees from vertical, the bottom portion of the frame providing bearings 35 and 36 which are shown as provided with boxes covered over by the top section 34 when it is in place. The shafts 3 and 18 are connected together by suitable driving gears, such as the gears 24 and 25, covered by suitable housing 26a. Whereas, in the form shown in Figures 1, 2 and 3, in order to remove the armature of the generator it is necessary to lift off the engine 1 and raise the top section 10 of the base 4, in the arrangement shown in Figures 4, 5 and 6 the engine may remain on the base 4a and access can be had to the generator armature merely by lifting the top section 34, which constitutes the top of the generator frame and a cover for the generator tunnel 5. The width of the unit shown in Figures 4, 5 and 6 is greater, but the height is less.

Since the generator is heated by the passage of current therethrough ($I^2R$ loss) and is completely enclosed, it would tend to overheat if operated at any considerable load. Ventilating and cooling is necessarily resorted to in order to carry off the heat, and serves also to dispose of such particles of copper, carbon, or the like as result from wear at the commutator. Our construction is well adapted to this purpose, since the generator tunnel provides room for a blower, and also, if desired, provides room for a heat exchange device, or cooler, as shown in Figures 7 and 8.

The embodiment shown in Figures 7 and 8 provides a closed cooling circuit for air. In this case a cooler 37, consisting preferably of a drum-shaped cooler, through which water is circulated, with air conducting tubes extending between the heads of the drum for the passageway of the air to be cooled, is provided. Such a drum-shaped cooler or heat exchanger may be supplied with sea water by a convenient pump and connections (not shown), as the same will be obvious to those skilled in the art.

The generator shaft 18 has a blower, in this case shown as a fan 37a, for compelling the circulation of air through the cooler 37, thence through the generator 6; thence upwardly through openings indicated at 38—38 on each side of the vertical plane of the top section 14 of the generator tunnel.

Similar openings may be provided leading to the space 9 between the engine crank shaft and the base 4, the air driven through the generator and through the openings 38—38, then passing through the longitudinal passageways 39—39 and back into the generator tunnel through openings 40 at the forward end of the cooler 37. Thus a closed circuit for the flow of cooling and ventilating air is provided.

Figure 9:
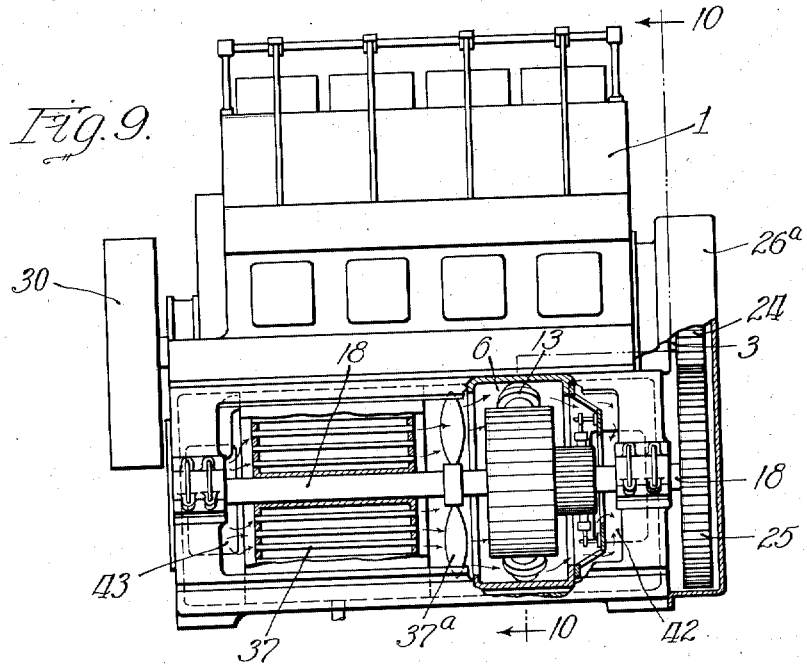
Figure 9 is a side elevation, with parts broken away, showing another embodiment of the invention.
Figure 10:
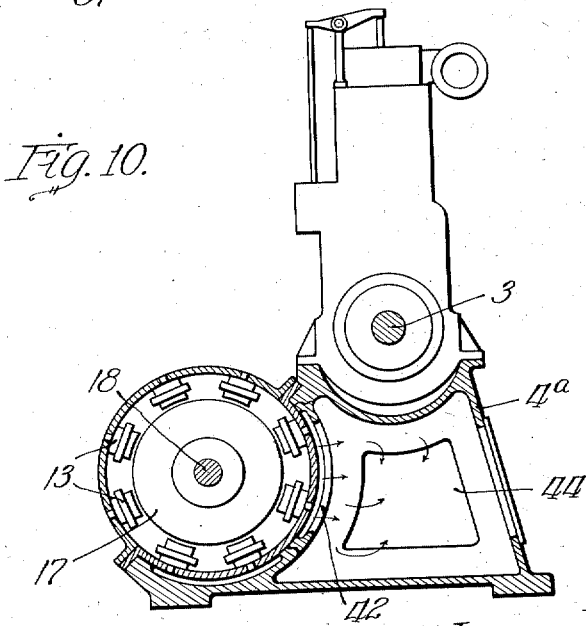
Figure 10 is a vertical cross section view taken on the line 10—10 of Figure 9.

The embodiment shown in Figures 9 and 10 is similar to the form shown in Figures 4, 5 and 6, with the inclusion of the fan or blower 37a and a cooler 37 to provide a closed circuit through the generator tunnel, including the cooler 37 and the generator 6, the return path being through an opening 42 shown at the right of Figure 9, and a corresponding opening 43 shown at the left of Figure 9, the hollow base 4a providing a longitudinal passage 44.

In the form shown in Figures 11 and 12 the cooler 37b has been set in the base 4a and the fan or blower 37a is driven at a higher speed than the generator shaft 18 through the step-up gear 45, which is disposed in the generator tunnel 5, the bearing 19 in this case being moved closer to the generator 6 and the step-up gear 45 having a case or housing forming a support for the gears contained therein. The step-up gear shown comprises a large gear on the generator shaft driving a pinion on the lay shaft 46, the lay shaft having a gear driving a pinion on the blower shaft 47. Obviously, instead of this spur gear form of step-up, an epicyclic or concentric type of step-up gear may be employed, or any other form of step-up gear suitable for the purpose may be utilized. The fan, or blower 37a moves the air through the generator 6 through an opening in the side wall such as 42 through the cooler 37b back into the generator tunnel through the opening 43. The direction of air movement is not important.

The cooling and ventilating of the generator may be done with an open circuit cooling flow or a closed circuit, as previously described.

In Figures 13 and 14 we have shown an embodiment in which the cooling air, after it passes through the generator, is delivered into the intake passageways of the engine for supercharging and/or scavenging. The engine which is here shown is of the injection type, for example, a Diesel engine. It has an air header 48, one end of which is connected through valve 48a to the supercharging air connection 49, which connection communicates with the interior of the generator tunnel through an opening 50 formed in the top section 14 of said generator tunnel. The opposite end of the air header 48 is controlled by a valve 52. By closing off the valve 48a and opening the valve 52, air is drawn at atmospheric pressure into the intake passageways of the engine. The generator tunnel may communicate through a valve 53 with an outlet pipe 54 for discharging the ventilating and cooling air after its contact with the generator to some other point if it is not desired to deliver it to the intake passageway of the engine. The inlet end of the generator has a grille or screen 55 through which air is drawn into the tunnel by the fan or blower 37a. It is to be observed that the fan or blower 37a is illustrated more or less diagrammatically and its specific form may be widely varied to suit conditions, or the particular design desired.

The ventilating air may be discharged into the engine room or overboard within our invention. In the form shown in Figures 13 and 14, the discharge of the cooling and ventilating air to the intake passageway of the engine results in its delivery through the exhaust connection 56 to a point overboard.

In Figures 15, 16, 17 and 20 we have shown a layout of an engine room in which six engine-generator units are employed. The cylindrical hull section 57 has transverse bulkheads 58, 59 which may extend completely across the section of the hull if desired, suitable doors being provided above the floor level to permit access to the engine room. The engine room being in communication with outside air, through known means such as a hatch, or duct, the air for the cooling of the generators and feeding of the engines may be drawn from the engine room and discharged through the exhaust overboard, or, if the air is not fed to the engines, it may be discharged partially or wholly into the engine room, suitable provision being made to control the temperature within the engine room.

The six units shown in Figures 15, 16 and 17 are alike, three on one side of an intake air trunk 60 and three on the opposite side of the same. In the construction illustrated, an air inlet pipe or tube 62 is led to an opening 63 in the top of the hull, this tube 62 communicating at its lower end with the transverse air trunk 60. The intake ends of the generator tunnels 5—5 communicate through suitable shutters, louvres, or the like, with the air trunk 60. Step-up gears 45 for increasing the speed of the blower shafts are disposed in the generator tunnels in line with the armature shafts 18. The blowers 37c, in this case shown as of the centrifugal type having volute casings, draw air from the ends of the tunnel into the tunnels remote from the air trunk 60, and discharge air under pressure into the air boxes, such as 64—64 (see Figure 17), the air delivery connection 49, for delivering air under pressure to the air headers of the engines, communicating with the tops of said boxes 64—64. The blowers 37c are housed in chambers, or boxes 65—65, disposed directly below the delivery air boxes 64. It will thus be seen that as any particular engine and its connected generator are operated, air is drawn through the opening 63, pipe 62, into the air trunk 60; thence it passes through the grille, shutter, or the like, 55, into the corresponding generator tunnel, and is drawn by the blower 37c from the corresponding suction box 65 and delivered under pressure to the plenum box 64, and thence delivered by the pipe 49 to the corresponding engine.

Each engine thereby has its own pressure connection and its own inlet connection, the operation of any one unit being thereby completely independent of the other units, each effecting its own ventilation, supercharging and scavenging. The transverse base or floor plate 67 upon which the bases of the engine-generator units rest is supported from the bottom of the hull by suitable frames 68—68, thereby leaving a space between the bulkheads 58—59 and the floor plate 67, which may serve as tankage space, as for example, to store lubricating oil. This space may be suitably subdivided. The driving gear between the engine shafts and generator shafts is preferably arranged at the ends adjacent the intake air trunk, this detail being omitted for the sake of clearness.

In the embodiment shown in Figures 18 and 19 a somewhat similar disposition of the engine-generator unit is made, with a different arrangement, however, of the blowers, air trunks, etc. In this case the transverse air trunk 60 is reduced in size but is disposed between the adjacent ends of the units, which units are disposed in two rows of three each on opposite sides of the trunk 60. In this case the blowers 37c have their intake connections communicating directly with the transverse air supply 60 and they deliver into the individual boxes 69 communicating with the adjacent ends of the generator tunnels 5, the remote ends of which generator tunnels communicate with chambers or boxes 70. The boxes 70 in turn are connected by air connections 49 to the intake headers 48 of the engines for delivering the air under pressure to the engines.

The gears for driving the generators and blowers are preferably disposed at the ends remote from the intake trunk 60, the speed of the blower shafts being stepped up above the speed of the generator shafts by the step-up gears 45, which is suitably located. The disposition of this arrangement in the hull is, except for the difference above noted, the same as in connection with the Figures 15, 16 and 17.

Referring now to Figures 21 to 30, we have shown an engine room providing a power plant embodying our invention, the showing being that suitable for submarine construction. Six engine-generator units are arranged to supply power for propulsion, battery charging, etc.

As will be seen in Figure 21, the six units 72 to 77, inclusive, are disposed in two rows of three each, upon opposite sides of the air intake tunnel 60. This tunnel has short upwardly extending intake pipes 78, 79 leading to a point well above the floor 80 communicating with the interior of the engine room so as to take air from the central part thereof. These air intake tubes or standpipes 78, 79 are out of register with the hatch 82a by which communication with the atmosphere is established. Accidental entry of water or of spray into the air passages is thereby prevented, due to the employment of the engine room as a large separating chamber through which the air moves at low velocity only.

The hatch 82a is at the forward end of the engine room and is provided with a ladder 83a leading to the floor 80. However, the engine room communicates preferably with the main air induction connection through a control valve 85a.

Within the transverse air trunk 60 we dispose the heat exchangers 82 to 87, inclusive, these heat exchangers being individual to the units 72 to 77, inclusive, respectively. These heat exchangers are cooled by pumping salt water therethrough by means of the salt water pumps 88. The fresh water which is employed in the engine jackets is circulated through the heat exchangers as by means of the fresh water pumps 89, as will be explained more in detail later.

It will be noted that there are six heat exchangers, one for each engine. The intake for the seawater pump 88 comprises a transverse main for each set of engines. Referring to Figure 24, the water intake for the forward set of engines 35 comprises a connection 90 extending between the inner, or pressure hull 57 and the outer hull 92. This connection 90 opens at 93 through the outer hull 92 into communication with the sea, or water in which the craft travels. A valve 94 controls the connection of the sea suction connection 90 with the main 95. A filter 96 is interposed, this filter being disposed within the transverse air trunk. Suction branches such as 97, 98 and 99, shown in elevation in Figure 24, extend from the pipe or manifold 95 to the individual engine circulating pumps and these circulating pumps, such as 88, drive the water through the corresponding heat exchangers.

The sea water connection 93, 90 and 95 for the forward engines 72, 73 and 74, is duplicated for the engines 75, 76 and 77, as shown in dotted lines on Figure 21, corresponding parts being designated as 93a, 90a and 96a, respectively. There is a cross connection 107 between the two sea water mains or manifolds 95 and 95a controlled by a suitable valve 108. This is for the purpose of permitting either sea inlet to serve either set of engines. Individual valves control the suction pipes 97, 98 and 99 on the forward engines and similar valves control the suction for the aft engines. These valves are indicated at 109 on Figure 21.

The construction of the individual engine-generator units is shown more in detail in Figures 25 to 28, inclusive. The transverse base plate 67a (see Figure 23) is supported by vertical transverse frames, such as 100 (see Figures 23 and 26) which form struts or braces between the pressure hull 57 and said transverse base or frame plate 67a.

The horizontal transverse frame plates 67a for each set of engines have semi-cylindrical grooves or depressions 102, 102, forming the lower halves of the generator tunnels 5 for each unit. Transverse vertical frame plates 103 and 104 at the ends of the grooves or depressions 102 form bulkheads defining oil storage or other liquid storage chambers. The vertical plates 100—100 are perforated as shown in Figure 23. A ventilating tunnel 105 extends the full length under the engine room.

The bottom wall 111 of the transverse air trunk is suitably supported from the bottom of the pressure hull, and in conjunction with the bulkheads 104—104 forms further storage space. A single deck for the personnel is provided by the floor 80, which lies substantially on or slightly below the median horizontal axis of the engine room. Storage spaces 106—106 are provided at the opposite ends of the engine room between the end bulkheads 58, 59 and the vertical frame plate members 103—103. The upper half of the generator tunnel 5 is formed, as is shown more in detail in Figure 27, by a circular plate 91, which forms the bottom wall of the engine base frame corresponding to the frame 4, as shown in the earlier embodiments. The engine base frame here designated 81 is built up of the semi-cylindrical shell or wall 91 and outer walls 110, 112, between which are provided stiffening frames, such as 113 and 114. A longitudinally extending wall 115 at the right of Figure 27 is joined at its lower end to the semi-cylindrical wall 91, and at its upper end to the wall 81, the junction forming a flange 116 to which the flange 117 of the upper half of the crank case of the engine is secured.

This wall 115 is preferably imperforate. A similar wall 118 upon the opposite side is joined at its upper end to the outer wall 110 to provide a bolting flange 116. The wall 118 is preferably also imperforate. Oil from the engine crank case is preferably withdrawn by a pump (not shown) and is discharged into the chamber 119, the space serving as an oil reservoir for the engine. The opposite side of the engine base may be similarly utilized. An oil cooler 120 forming a heat exchanger between the oil and the jacket water of the engine is disposed in said chamber 119. This regulates the temperature of the oil.

It is to be observed that the generator is of considerable less length axially than is the engine, and the ventilating tunnel which is formed in part by the concaved extension of the crank case of the engine is exposed to the current of air circulated through the generator. The cooling and ventilating current of air which maintains the temperature of the generator at a suitable value is capable, at the same time, of carrying off excess heat from the crank case. This is a feature of considerable value, as a fairly extensive surface of the body of lubricating oil is exposed to the cooling current of air in the generator housing and tunnel.

The opposite side of the saddle shaped frame may likewise be employed for oil storage and/or temperature control, if so desired. An inspection opening 122 is formed through the right hand side as viewed in Figure 27, this opening having a suitable cover 123 removable to permit inspection of the commutator armature and field windings of the generator 6. A similar inspection opening, with removable cover (not shown) is provided for access to the rear bearing 20 and the step-up gear 45. The generator has a cylindrical field frame 124, which is supported on anti-friction bearings or rollers 125—125, mounted on a semi-cylindrical wall 102 to permit the frame to be turned angularly, as by means of a worm and gear (not shown), and to be locked in position for normal operation.

The brush rigging is not shown in Figure 26, but it will be understood that it may be mounted rigid with the field frame 124, or otherwise disposed in suitable position to cooperate with the commutator 22, and be adjustable rotarily for inspection and service as the field frame is turned.

The bearings 19 and 20 are provided by suitable pedestals 126 and 127, constructed substantially as shown in Figure 28, to fit in the groove or depression in frame 67a. These pedestals are supported upon the cylindrical shell 102, which in turn is supported by the transverse vertical frames, such as 100, 103, 104.

The step-up gear 45 is disposed between the bearing 20 and the adjacent end of the tunnel 5 to bring the shaft of the blower 37c into axial alignment with the armature shaft 18, that is, to substantially concentric with the cylinder tunnel 5. The housing 128 of the blower 37c is mounted upon a tubular neck 129, the end thereof telescoping into and being connected to the end of the tunnel 5.

The housing of the blower 37c has a tangential discharge connection 130 which communicates with the pipe 49, this pipe in turn being connected to a super-charge air header leading to the intake openings of the respective cylinders of the engine.

The engines herein shown are illustrated as of the eight cylinder V-type, although this is optional. The supercharge air header 48 communicates by two branches with the two sets of engine cylinders of each engine, each blower being individual to its engine.

At the intake end of the tunnel 5 we provide a valve in the form of an air register, comprising a slotted plate 132, with which a movable slotted plate 133 cooperates, the movable plate 133 being provided with a worm gear 134 (see Fig. 28) and a worm 135, which is operated by hand wheel 136 above the floor 80. The valve plate 132 is disposed back of the bearing 19, and in advance of the generator 6. Its purpose is to control the relative distribution of air through the various generators and to control the rate of supercharging.

The engine has at the air intake end of the tunnel a gear 24 which meshes with a suitable idler 137, and the idler in turn meshes with the generator pinion 25. A suitable gear case 138 forms a closed housing for the gear, the idler and the pinion, a portion of the same being shown on Figure 26. This gear case is adapted to contain a quantity of lubricant.

An oil pump 140 driven from the end of the crank shaft of the engine draws oil by way of the pipe 142 from the sump 119 formed in the hollow base of the engine frame and discharges the same through the oil filter 143 and pipe 144 into the lubricating oil cooler 120. From thence the oil is distributed to the bearings of the engine. The jacket water is drawn from the engine jackets by the manifold pipe 145 from each side of the engine into the intake 146 of the jacket water pump 89. A standpipe 147 leads to an overhead makeup water tank 148, disposed at a suitable height above the engines (see Figure 22). The discharge of the jacket water circulating pump 89 is by way of a pipe 149 which leads to the top of the heat exchanger 82. From the bottom of the same, pipe 150 conveys the jacket water into and through the tubes of the lubricating oil cooler 120, the delivery of the jacket water from the cooler 120 being by way of pipe 152 and branches 153 and 154 leading to opposite sides of the engine for cooling the jackets.

The salt water circulating pump 88 which has its intake 97 connected to the water main 95, (see Figure 24), not shown in Figure 25, discharges water through the pipe 155 to the top of the heat exchanger 82, water passing down through the tubes of the heat exchanger and returning again to the top, and being discharged through the pipe 156 which leads, at the opposite end of the engine, to the jackets of the exhaust pipes (see Figure 23). The two exhaust pipes from the two sets of cylinders of each engine are manifolded together at 157 (see Figure 23). The exhaust pipe, such as 157, of which there is one for each engine, extends through a suitable shut-off valve 158 to an evaporator 159, and from the evaporator, a common exhaust pipe 160 (see Figure 21) leads to a muffler 162, which is disposed within the superstructure 163 and leads overboard.

Referring to the plan view of Figure 21, it will be seen that the three forward engines 72, 73 and 74 have their exhaust pipes 157 connected to the evaporator 159, and the rear set of three engines likewise have their exhaust pipes connected to a similar evaporator 159a, and it in turn is connected to a muffler, not shown.

Each evaporator is provided with an outside exhaust valve 165, and an outside exhaust valve operating mechanism 164. Each of the individual engine exhaust pipes has its own inside exhaust valve 158.

Forward of the units 72, 73 and 74, we have provided auxiliary engine-generator units 166 and 167 of suitable voltage and capacity to supply current for excitation of the main generators, for the lights, auxiliaries, cooking purposes and the like, these units being on a small scale substantially like the main engine units and having their fresh water cooler, sea water pumps and jacket water pumps like the pumps 88 and 89, respectively. The units are preferably employed for furnishing exciting current for the main generators, such units 166 or 167 being operated at substantially uniform speed and voltage, whereas the main units may be operated at different voltages for variable speed propulsion purposes, battery charging purposes, and the like. Various auxiliaries such as fuel oil pumps 168 and 169, fresh water distiller 170, fresh water tanks 171, and the like are disposed within the engine room.

At the forward end of the engine room there is an oil purifier 172 for purifying the oil drawn from the oil storage spaces formed in the bottom of the engine room. An oil tank 173 forms a gravity supply for fuel oil for the engines.

The tanks in the bottom of the engine room may supply normal lubricating oil from the tanks 174 and 175, and dirty lubricating oil may be stored in the tank 176, subject to being purified for subsequent use, whereas the tanks 106—106 preferably form reserve lubricating oil tanks.

Figures 31 to 34 inclusive illustrate a modified embodiment of our invention in which the cooling circuit for the generators is a closed circuit, air being moved through the generator and through a heat exchange device, as disclosed in connection with Figures 7, 9 and 12. The heat exchange device is cooled by salt water from the circulating pump, such as 88 heretofore described. The air supply arrangement is modified in that the air for supercharging and/or scavenging the engines is provided by individual blowers taking the air preferably from below the main deck of the engine room through high speed blowers driven from the crank shaft of the engine. The arrangement for cooling the jacket water through a heat exchange device fed from the circulating pump such as 88 is substantially the same as described in the immediately preceding embodiment. The circulation of jacket water and the circulation of lubricating oil and cooling of the same is substantially identical with the preceding embodiment. The engines, as in the preceding embodiment are disposed above the main deck and the generators below the main deck. The crank shafts of the engine are preferably, but not necessarily, on the plane of the longitudinal axis of the hull. The drive of the shaft of the generator 6 through suitable gears such as illustrated in Figure 26 is the same in the present embodiment as that in the preceding embodiment. Upon the end of the generator shaft 18, at the right as viewed in Figure 32, a cooling fan or blower 190, with a suitable blower casing, is mounted in a chamber 191. The end wall of the chamber has a pair of heat exchange devices 192 and 193 placed one behind the other across the same, these heat exchange devices being cooled by salt water from the pump 88 through the pipe 194 and branch pipes 195 and 196. The branch pipes have suitable valves therein to control or shut off the heat to the respective heat exchange devices 192 and 193, respectively. These branch pipes lead to the bottom of the heat exchange devices, and the upper ends of the heat exchange devices are connected by outlet pipes 197 and 198, respectively, to the branches 199 and 200 of the exhaust manifold 157. Suitable valves are provided in these outlet pipes for control of flow therethrough. The air which is forced through the heat exchange device 192, 193 by the fan 190 enters an outlet nozzle 202 at the end of the corresponding generator, and this outlet nozzle is connected by a conduit 203 leading back to the opposite end of the generator housing where a diagonally arranged elbow 204 opens into the generator housing between the outer shell 102 of the same and the gear box 138, the oblong opening being indicated at 205 in Figure 33. The fan 190 is preferably a multi-vane blower having a suitable volute casing as indicated in dotted lines at 206 in Figure 33. Obviously, any suitable fan or blower may be employed. The cooling water discharged by the salt water pump 88 through the corresponding heat exchange devices such as 82 (see Figure 31), is discharged through a connection 207 to the exhaust manifold, as shown in detail in Figure 23 in connection with the previous embodiment. Obviously, if desired, other disposition may be made of cooling water from either the heat exchange devices 192, 193, which cool the air circulation of the generator 6, or of the cooling water from the heat exchange devices, such as 82, which cool the jacket water of the engine. It may, for example, be discharged overboard other than through the exhaust pipe jacket or the exhaust pipe. The heat exchange devices 192, 193 may be of any suitable type, preferably, however, being of the fin and tube type, to provide a large superficial area for engagement with the circulating air for cooling the generator. The heat exchange device is arranged in two sections for safety and convenience of repair.

The auxiliary units 166 and 167 are similarly modified to employ closed generator cooling circuits utilizing heat exchange devices 208, 209, provision for cooling the same being made through supply pipe 210, which is fed by circulating pump 212, supplied with salt water from the mains 95 or 95a through the sea water connection, such as 93 or 93a, shown in Figure 25. The discharge from the heat exchange devices 208, 209 extends through the pair of pipes 213 to the branches of the exhaust pipe 214, as in the case of the main engines. The auxiliary exhaust pipes 214 are controlled by shut-off valves leading to the exhaust evaporator 159, as in the case of the main exhaust valves. The auxiliary engine-generator units are provided with blowers or fans 215. As in the case of the main units, the blowers 215 have volute casings 216 coupled to conduits 217 leading to the heat exchange devices 208, 209, and a conduit 218 leads back to the opposite end of the generator tunnel or housing.

The air intake for the main and auxiliary units is in each case through an individual connection and a blower, taking air from below the deck 80 and delivering the same to the intake passageway of the engines. Stand pipes or louvres 79, 79 communicating at their upper ends at points well above the bottom of the upper chamber, lead to the space below the deck 80, which space forms an intake chamber substantially at atmospheric pressure, or slightly below the same, for the engines. Referring particularly to Figure 33, the intake for the unit 74 at the left of the figure comprises an elbow fitting 219 communicating at its lower end vertically with an opening through the deck 80, and at its other end, horizontally with the intake of a high speed blower 220, which blower is driven at a speed above that of the crank shaft through suitable gears, not shown. A volute casing 222, within which the blower 220 is contained, has a delivery pipe 223 leading to the intake manifold of the engine. The blower 220 is preferably a multi-vane type blower, and the arrangement shown confines the noise of the same chiefly below decks.

The intake for the other engines is substantially identical with the intake above described. The auxiliary units, such as 166 (see Figure 34) similarly employ an elbow fitting 219, a blower 220, a multi-vane casing 222, and a delivery pipe 223 communicating with the intake passageway of the said engine.

The heat exchange devices for cooling the jacket water of the auxiliary engines are shown at 224 (see Figures 31 and 32). They are supplied with cooling water from the sea intakes 93 and 93a and mains 95—95a, and the discharge also is through the exhaust jacket or otherwise, as in the case of the main engines.

Compressed air flasks 225 are stowed below decks, and it is contemplated that the engines of this or the previous embodiment may be started either by compressed air or through the generators operating as motors.

In respects not otherwise mentioned the structure of the present embodiment is identical with the embodiment shown in Figs. 21 to 28. The framing or foundations are suitably altered to provide the necessary space and openings for the circulating ducts for cooling of the generators. The mounting and construction of the generators is substantially the same as described in connection with the immediately preceding embodiment.

While we have described the specific embodiment in considerable detail, it is to be understood that the invention is not limited to such details except as such details appear in the appended claims.

While we have shown the engines as provided with individual high speed blowers for supercharging and/or scavenging, it is to be understood that where supercharging by use of the cooling and ventilating air from the generator is not required, individual blowers are not essential, and one or more blowers may be employed with valves or louvres for distributing the air flow to the units in operation. While in the embodiments shown in Figures 1 to 20, inclusive, the base which supports the engine and forms the generator housing and tunnel is arranged to seat on a flat foundation, in the embodiments shown in Figures 21 to 28 the transverse horizontal frame plate 67a and the vertical frames 100 provide a common base for three units, which base rests upon the pressure shell of the craft. Suitable frames are disposed between the pressure shell and outer shell of the vessel, as is well known to those skilled in the art.

In Figure 29 we have illustrated diagrammatically the operating units of a system suitable for submarine propulsion. The engine-generator units 180 may be arranged as illustrated in Figures 21 to 28, within the engine room. The auxiliary engine-generator units 166, for excitation and auxiliary load, are likewise disposed in the engine room. A control room is disposed at the rear of the submarine over the motor room which includes two sets of motor armatures 181 and 182, directly coupled to the propeller shafts 183 and 184, respectively. While we have shown two motor armatures for each propeller shaft any suitable number may be employed. One or more batteries such as 185 and 186 are adapted to be charged by the engine-generator units 180, and in turn to operate the motors 181 and 182 when desired. As heretofore explained, the voltage of the batteries, the voltage of the motors 181, 182 and the voltage of the main generators are preferably so related that a generator such as 6 may, under suitable field control and without disproportion in voltage or capacity, serve either as a battery charging generator or as a part of the electric transmission for surface propulsion.

Figure 30 indicates in a generally diagrammatic manner that the batteries 185, 186, generators 6, 6 and motors 181, 182 may be suitably interconnected for purposes heretofore described. The batteries are provided with a battery bus 226, to which they may be individually connected. The generators are provided with busses 227, 228 to which they may be individually connected. The motors 181, 182 are provided with motor bus 229 to which they may be individually connected. Cross connecting busses 230 and 232 are adapted to interconnect any of the aforesaid busses.

Suitable switches, as will be apparent to one skilled in the art, are provided for connecting the individual units to the busses, the busses to each other, and for sectionalizing the busses.

The electrical power control circuits are not a part of this invention and may be of any known and/or suitable type.

We designate the engines herein shown in the various embodiments as of the vertical type, including not only those forms which have the cylinders strictly vertical, as shown in the embodiments Figures 1 to 20, inclusive, but also the V type engines, shown in the embodiments Figures 21 to 34, wherein the cylinders are disposed at an acute angle to the vertical. In all of these forms, the cylinder heads are raised well above the horizontal so that the heat of the working cylinders is remote from the generators. This provides an engine-generator unit which is relatively tall and narrow, suitable for installation in laterally confined space.

We do not intend to be limited to details, except as the same are recited in the appended claims.

We claim:

1. In a submarine having a cylindrical hull section provided with a transverse floor member having intermediate supporting means, the combination of an internal combustion engine having a crank shaft and a depending crank case therefor disposed beneath said floor member, a hollow frame connected to said crank case and disposed beneath said floor member for supporting said engine, said frame forming a closed generator housing, a generator disposed in said housing, said generator having a rotor shaft bearing on said frame for the rotor shaft, a driving connection between said shafts, and air impelling means driven from said generator shaft for moving air from the upper portion of said hull section above said floor member by means of air conduits extending through said floor member into the housing to cool the generator, said engine having an intake passageway opening below said floor, said impelling means including a blower for causing air to flow through the generator to cool and ventilate the same, and means for conducting the air from said generator into the intake passageway of the engine.

2. In combination, in a submarine having a substantially cylindrical hull section provided with a transverse floor member, an internal combustion engine disposed above said floor member and having a depending crank case, a crank shaft, a hollow frame below said floor member forming an extension of the crank case and constituting a generator housing and air tunnel, a generator disposed in said housing and having a rotor shaft driven by said engine shaft, an air cooler disposed in said hollow frame, and means for circulating air from the upper portion of said hull section through said member into said air cooler and generator.

3. In combination, in a submarine having a substantially cylindrical hull section provided with a transverse floor member, an internal combustion engine having a crank shaft, a hollow base frame beneath said floor member for supporting said engine in elevated position thereabove, said base frame comprising a generator housing and an air tunnel below said floor member, a generator in said housing, said generator having a shaft driven by the crank shaft, an air cooler disposed in said housing endwise of the generator, said housing and tunnel providing a closed circulation for air through the cooler means for delivering air from the upper portion of said hull section to the space beneath said floor member, the generator, and a blower driven from the generator shaft for circulating air in said circuit, and means for delivering air from the space below said floor member to the intake of said engine.

4. In a vessel of the class described, a generally cylindrical enclosing hull, a base comprising a transverse horizontally disposed plate, vertically disposed braces between the plate and said hull, a transverse air tunnel disposed above said plate, a row of engine-generator units on each side of said tunnel, said units each comprising a hollow frame forming a generator tunnel and an engine having its frame clamped to the aforesaid frame, a generator in each generator tunnel, each generator having a shaft driven by the corresponding engine shaft, a blower for each generator tunnel for ventilating the corresponding generator, said generator tunnels being all connected to said transverse air tunnel.

5. In a vessel of the class described, a generally cylindrical enclosing hull, a base comprising a transverse horizontally disposed plate, vertically disposed braces between the plate and said hull, a transverse air tunnel disposed above said plate, a row of engine-generator units on each side of said tunnel, said units each comprising a hollow frame forming a generator tunnel and an engine having its frame clamped to the aforesaid frame, a generator in each generator tunnel, each generator having a shaft driven by the corresponding engine shaft, a blower for each generator tunnel for ventilating the corresponding generator, said generator tunnels being all connected to said common air tunnel, each blower having a discharge connection, each engine having an air intake pipe to which the blower discharge is connected for scavenging and supercharging the engine.

6. In a vessel of the class described, a generally cylindrical enclosing hull, a base comprising a transverse horizontally disposed plate, vertically disposed braces between the plate and said hull, a transverse air tunnel disposed above said plate, a row of engine-generator units on each side of said tunnel, said units each comprising a hollow frame forming a generator tunnel, and an engine having its frame clamped to the aforesaid frame, a generator in each generator tunnel, each generator having a shaft driven by the corresponding engine shaft, a blower for each generator tunnel for ventilating the corresponding generator, said generator tunnels being all connected to said common air tunnel, a step-up gear between the generator shaft and the blower, said gear being disposed in the corresponding generator tunnel.

7. In a vessel of the class described, an enclosing hull section having a hatchway with a closable hatch, a base comprising a transverse horizontally disposed plate, vertically disposed braces between the plate and said hull, a transverse air trunk disposed adjacent one end of the plate, a row of engine-generator units mounted on said plate, said units each comprising a hollow frame defining a generator tunnel communicating with the air trunk, engines mounted on said hollow frames, generators in said tunnels, each generator having a shaft driven by the corresponding engine shaft, a blower for each generator tunnel for ventilating the corresponding generator, an inboard connection for the air trunk for taking in air from within the hull section, said connection comprising a standpipe out of register with the hatchway.

8. In a vessel of the class described, a hull section defining an engine room, a horizontal floor plate disposed within the hull, braces between the floor plate and the hull, transverse bulkheads closing the ends of the space below the floor to define oil storage tanks, a transverse air trunk opening into the engine room, rows of generating units upon each side of the trunk, said units comprising each a generator tunnel communicating with the air trunk, controllable valves between the generator tunnels and the air trunk, and means for moving air from the air trunk through the generator tunnels.

9. In a vessel of the class described, a hull section defining an engine room, a horizontal floor plate disposed within the hull, braces between the floor plate and the hull, transverse bulkheads closing the ends of the space below the floor to define oil storage tanks, a transverse air trunk opening into the engine room, rows of generating units upon each side of the trunk, said units comprising each a generator tunnel communicating with the air trunk and controllable valves between the generator tunnels and the air trunk, and means for moving air from the air trunk through the generator tunnels, said generating units comprising injection type internal combustion engines having each an air intake, said air intakes being connected to the discharge end of the generator tunnels.

10. In combination, a hull, a floor plate having a trough formed therein, frame members between the plate and the hull, an internal combustion engine having a crank shaft, a crank case for the engine, said crank case having depending legs defining a concave cover forming, with the trough, a generator tunnel, a generator frame disposed in said tunnel, a generator shaft geared to the crank shaft, and bearings for the generator shaft supported by said frame members within said tunnel.

11. In combination, a hull, a floor plate having a trough formed therein, frame members supporting said plate from said hull, an internal combustion engine having a crank shaft, a crank case for the engine, said crank case having a hollow arched extension disposed over said trough and supported on said frame above the plate, said arched extension forming a concaved cover for the trough, said cover and trough defining a generator tunnel, a generator in said tunnel, said generator having a shaft driven by the crank shaft and having a frame rotarily adjustable in said tunnel, said cover having normally closed inspection openings accessible from the floor, an end plate for each end of the tunnel, a valve adjacent one end plate to control the flow of air through the tunnel, and a blower driven by the generator shaft mounted adjacent the other end plate, said blower having an inlet opening communicating with the tunnel.

12. In combination, a hull, a floor plate having a trough formed therein, frame members supporting said plate from said hull, an internal combustion engine having a crank shaft, a crank case for the engine, said crank case having a hollow arched extension disposed over said trough and supported on said frame above the plate, said arched extension forming a concaved cover for the trough, said cover and trough defining a generator tunnel, a generator in said tunnel, said generator having a shaft driven by the crank shaft and having a frame rotarily adjustable in said tunnel, said cover having normally closed inspection openings accessible from the floor, an end plate for each end of the tunnel, a valve adjacent one end plate to control the flow of air through the tunnel, and a blower driven by the generator shaft mounted adjacent the other end plate, said blower having an inlet opening communicating with the tunnel, a step-up gear between the generator shaft and the blower, and a duct leading from the discharge of the blower to the intake of the engine.

13. In combination, a generally cylindrical hull section constituting an engine room, a floor plate disposed approximately at or below the plane of the horizontal axis of the hull section, a transverse air trunk disposed mainly below said floor plate, said trunk opening into the engine room above the floor plate, a transverse frame plate on each side of the air trunk, said frame plates being disposed on a lower level than the floor plate, a plurality of parallel substantially semi-cylindrical grooves in said frame plates, frame members between said frame plates and the hull, engines having crank shafts and crank cases, said crank cases forming arched, substantially semi-cylindrical covers for said grooves in the frame plates to define generator tunnels, said tunnels having intake ends disposed adjacent said air trunk, valves controlling the communication of the tunnels with said trunk, generators in said tunnels, said generators having shafts geared to the crank shafts by gears disposed at the intake ends of the tunnels, and blowers driven by the generator shafts and disposed at the discharge ends of the tunnels.

14. In combination, a generally cylindrical hull section constituting an engine room, a floor plate disposed approximately at or below the plane of the horizontal axis of the hull section, a transverse air trunk disposed mainly below said floor plate, said trunk opening into the engine room above the floor plate, a transverse frame plate on each side of the air trunk, said frame plates being disposed on a lower level than the floor plate, a plurality of parallel substantially semi-cylindrical grooves in said frame plates, frame members between said frame plates and the hull, engines having crank shafts and crank cases, said crank cases forming arched, substantially semi-cylindrical covers for said grooves in the frame plates to define generator tunnels, said tunnels having intake ends disposed adjacent said air trunk, valves controlling the communication of the tunnels with said trunk, generators in said tunnels, said generators having shafts geared to the crank shafts by gears disposed at the intake ends of the tunnels, blowers driven by the generator shafts and disposed at the discharge ends of the tunnels, auxiliary apparatus for said engines disposed in said air trunk, said auxiliary apparatus comprising heat exchangers for cooling the jacket walls of the engine, and pumps individual to the engines for circulating the jacket water through the engines and heat exchange devices.

15. In combination in a submarine, a hull portion providing an engine room, a transverse air trunk opening into the engine room, horizontal frame plates on each side of the trunk, frames between said frame plates and the lower part of the hull portion for providing a foundation, said frame plates and frames being shaped to provide substantially semi-cylindrical grooves forming the lower parts of generator tunnels, engines disposed above said grooves, the engines having upwardly concaved frame portions disposed over said grooves forming the upper parts of said generator tunnels, crank shafts for the engines mounted in said engine frames, generators disposed in said tunnels, said generators having rotor shafts geared to said crank shafts, said generator tunnels each communicating with said air trunk, and blowers connected to the opposite ends of the tunnels for drawing air from said trunk through said tunnels.

16. In combination, in a motor-propelled ship having a cylindrical hull section provided with a transverse floor member, a transverse air trunk disposed beneath said floor member, a generator tunnel communicating with said air trunk, an internal combustion engine mounted on said generator tunnel and extending above said floor member, a generator in the tunnel having a rotor shaft, said engine having a driving shaft geared to said rotor shaft, a jacket water circulating pump for the engine, a heat exchanger mounted in said air trunk, a cooling water pump driven by the engine for supplying cooling water from the exterior of said hull section to the heat exchanger, said pump being disposed above said air trunk, and means for delivering air from the upper portion of said hull section to said air trunk.

17. In combination, a substantially cylindrical hull section defining an engine room, said engine room having a hatch disposed substantially on the top median line, a transverse air trunk disposed substantially at or below the main horizontal diameter of the hull section, said air trunk having short upwardly extending intake pipes adjacent the opposite ends of the trunk out of register of the hatch, generator tunnels having air intake connections communicating with the air trunk, blowers for moving air from said air trunk through said generator tunnels, and connections for discharging the air from said tunnels overboard.

18. In combination with the hull of a submarine having an engine room, a closable atmospheric connection therefor comprising a hatchway and a hatch, a plurality of engines in said engine room, said engine room being divided by a deck into two chambers, the upper chamber constituting a space for personnel, the lower chamber having conduit means communicating therewith and extending to the intakes of the engines of the units, and means projecting upwardly from said deck and adapted to conduct air from said upper chamber into said lower chamber whereby the upper chamber is ventilated and the noise of the intake of the engines is confined below the deck.

19. In combination with the hull of a submarine having an engine room, a closable atmospheric connection therefor comprising a hatchway and a hatch, a plurality of engine-generator units in said engine room, said engine room being divided by a deck into two chambers, the upper chamber constituting a space for personnel, the lower chamber constituting a chamber for the intakes of the engines of the units, the engines being disposed in the upper chamber and the generators being disposed in the lower chamber, the upper chamber being adapted to be put into communication with atmosphere through said hatchway, and a conduit extending to the lower chamber from a point within the upper chamber sufficiently above the deck to exclude water accidentally entering the first chamber through said hatchway.

20. In combination with the hull of a submarine having an engine room, a closable atmospheric connection therefor comprising a hatchway and a hatch, a plurality of engine-generator units in said engine room, said engine room being divided by a deck into two chambers, the upper chamber constituting a space for personnel, the lower chamber constituting a suction chamber for the intakes of the engines of the units, the engines being disposed in the upper chamber and the generators being disposed in the lower chamber, a conduit for leading air from the upper chamber to the lower chamber, and blowers operated from the generators for supercharging the engines, said blowers having their intakes connected to the lower chamber.

21. In combination, a hull, a floor plate having a trough formed therein, frame members supporting the said plate from the hull, an internal combustion engine having a crank shaft, a crank case for the engine, said crank case having a hollow arched extension disposed over said trough and supported on said frame above the plate, said arched extension forming a concaved cover for the trough, said cover and trough defining a generator tunnel, a generator in said tunnel, said generator having a shaft driven by the crank shaft and having a frame rotarily adjustable in said tunnel, said concave cover having a normally closed inspection opening accessible from the floor, whereby rotation of the generator frame permits servicing of the generator through said inspection opening.

22. In combination, a hull, a floor plate having a trough formed therein, frame members supporting said plate from said hull, an internal combustion engine having a crank shaft, a crank case for the engine, said crank case having a hollow arched extension disposed over said trough and supported on said frame above the plate, said arched extension forming a concaved cover for the trough, said cover and trough defining a generator tunnel, a generator in said tunnel, said generator having a shaft driven by the crank shaft, an end plate for each end of the tunnel, a valve adjacent one end plate to control the flow of air through the tunnel, and a blower driven by the generator shaft mounted adjacent the other end plate, said blower having an inlet opening communicating with the tunnel.

23. In combination for use in a submarine, a hull section providing an engine room, an engine-generator unit in said engine room, said unit comprising a vertical engine ond a generator, the engine being disposed directly over and geared to the generator, said engine having a base saddled over the top of the generator, transverse hull frames in the hull section upon which the engine base rests, and a trough-shaped closure for the engine base, said closure covering the lower half of the generator and forming, with the engine base, a generator tunnel.

24. In combination for use in a submarine, a hull section providing an engine room, engine-generator units in said engine room, each unit comprising a vertical engine and a generator, the engine being disposed directly over and geared to the generator, each engine having a base saddled over the top of the corresponding generator, transverse hull frames in the hull section upon which the engine bases rest, a trough-shaped closure for each engine base, each of said closures covering the lower half of the corresponding generator and forming, with the engine base, a generator tunnel, a floor plate extending across the hull at approximately the level of the top of the engine bases, providing a deck for personnel, said units being disposed end-to-end in pairs within said engine room, a chamber extending under the floor plate transversely of the hull and between said pairs of units, a heat exchange device for each engine, said heat exchange devices being disposed in said chamber, a jacket water circulating pump for each engine for circulating the jacket water through the corresponding heat exchange device, a pump for each engine for circulating sea water through the heat exchange device, and manifolds for inlet and outlet of sea water through said heat exchange devices, said manifolds being disposed lengthwise of said chamber.

25. In combination for use in a submarine, a hull section providing an engine room, engine-generator units in said engine room, said units being disposed end-to-end in pairs, each unit comprising an engine and a generator, the engine being disposed directly over and geared to the generator, each engine having a base saddled over the top of the corresponding generator, transverse hull frames in the hull section upon which the engine bases rest, a trough-shaped closure for each engine base, said closures covering the lower half of the generators to form generator tunnels, a floor plate extending across the hull at approximately the level of the top of the engine bases, a chamber extending under the floor plate transversely of the hull and between said units, each unit having a blower for cooling the generator and a pump for cooling the engine, heat exchange devices for cooling the engines disposed in the transverse chamber and heat exchange devices for cooling the generator disposed at the ends of the units remote from said transverse chamber.

26. In combination for use in a submarine, a hull section providing an engine room, engine-generator units in said engine room disposed end-to-end in pairs, each unit comprising a vertical engine and a generator, the engine being disposed directly over and geared to the generator, each engine having a base saddled over the top of the generator, transverse hull frames in the hull section upon which the engine base rests, a trough-shaped closure for the engine base, said closure covering the lower half of the generator and forming a generator tunnel, and a heat exchange device for each generator, said heat exchange device being disposed transversely of the corresponding generator tunnel, a blower between the generator and the said heat exchange device, and an air conduit extending from the heat exchange device to the opposite end of the generator tunnel for providing a closed air circulation for ventilating the generator, said conduit extending through the corresponding transverse hull frames which support the units.

27. An engine-generator set suitable for use in a submarine, comprising the combination, with the hull, of an internal combustion engine having cylinders disposed substantially vertically and having a crank shaft and a crank case extending longitudinally of the hull, a personnel deck lying substantially at the level of the crank case permitting servicing of the engine from said deck, a generator mounted below said deck, a transversely extending hull frame having means providing a cradle extending longitudinally of the hull, a generator mounted in said cradle, said generator having a rotor shaft lying below and substantially parallel to the crank shaft of the engine, an intermediate frame forming an extension of the crank case of the engine arched over and closing the aforesaid cradle to provide a generator housing and ventilating tunnel, said frame resting upon said transverse frame, and driving gear between said engine and generator shafts.

28. In combination, in a motor-propelled ship, a substantially cylindrical hull section, spaced transverse bulkheads extending vertically thereacross and defining an engine room, a floor plate member providing a deck in said engine room, an engine-generator unit in said room having a generator disposed beneath said floor member, means forming a cooling tunnel about said generator beneath said floor member, means for drawing air from outside of said engine room through said floor member and through said generator tunnel, and means for supplying air to the engine of said unit from beneath said floor member.

29. In combination, in a motor-propelled ship, a substantially cylindrical hull section, spaced transverse bulkheads extending vertically thereacross and defining an engine room, a hatch at the top of said hull section, a floor plate member providing a deck in said engine room, an engine-generator unit in said room having a generator cooling tunnel disposed below said floor member, means disposed out of registry with said hatch and extending through said floor member for delivering air from the upper portion of said hull section to the space beneath said floor member, means for circulating said air through said generator tunnel, temperature controlling means in the path of said air, means for metering the amount of air passed through said tunnel, and means for delivering air from beneath said floor member into the intake of the engine of said unit.

30. In combination, in a motor-propelled ship, a substantially cylindrical hull section, a transverse floor plate member defining a personnel deck thereabove, an engine-generator unit comprising an engine having its crank case portion disposed beneath said floor member, and a generator unit disposed below said crank case and having a supporting casing forming, with said crank case, a generator tunnel, air conduit means extending substantially above said floor member adjacent the inner periphery of said hull section and opening into the space beneath said member, means for withdrawing air from beneath said floor level into the intake of said engine, means comprising a closed circuit air path for circulating air through said generator tunnel, and temperature controlling means in said air path.

31. In a motor-propelled ship having a hull section provided with vertical transverse bulkheads defining an engine room, a floor member in said engine room extending across said hull section, an engine-generator unit in said engine room comprising an internal combustion engine having a depending portion extending through said floor member, a frame member beneath said floor member for supporting said engine and engaging said depending portion to form a generator tunnel, a generator therein, and means for delivering air from the upper portion of said engine room through said floor member to said generating tunnel and to the intake of said engine.

32. In combination, a motor-propelled ship having an engine room formed in the hull thereof and having a hatch at the top thereof, a floor member in said room providing a space beneath said engine room, a generator disposed in said space, a generator tunnel about said generator, means disposed above said floor member for driving said generator, means in said room disposed out of registry with said hatch and extending a substantial distance above said floor member for delivering air to the space beneath said member and into said tunnel, and means for controlling the temperature of the air passing through said tunnel.

33. In a submarine, an engine room having a transverse floor plate, an air trunk disposed below said floor plate and in communication with said room above the floor plate, spaced engine-generator units disposed on opposite sides of said trunk, means for cooling the engines of said units including water circulating means, and heat exchange means for each of said units disposed in said air trunk for cooling said cooling means including opposed sea water suction connections.

34. In a submarine, an engine room having a transverse floor plate, an air trunk extending through said room beneath said floor plate and having means for receiving air from the upper portion of said room, engine-generator units disposed on opposite sides of said trunk, water cooling means for said units, and individual heat exchange means for each of said cooling means disposed in said trunk beneath said floor plate and including a suction water connection extending outwardly of said trunk to the exterior of said submarine.

35. In a submarine, an engine room, a transverse deck dividing said room into an upper personnel compartment and a lower compartment, an air trunk disposed beneath said deck, engine-generator units disposed on opposite sides of said air trunk, the generators of said units being disposed below said deck, means supporting said units in position including means forming air tunnels about each of said generators and communicating with said air trunk, and means for drawing air from said trunk through each of said tunnels.

36. In a submarine, an engine room, a transverse floor plate extending across said room, a lower compartment beneath said plate, engine-generator units in said room having the generators thereof disposed in said lower compartment, means forming air tunnels about each of said generators, and individual air circulating means for drawing air through each of said tunnels and closed to the air in said lower compartment.

37. In a submarine, an engine room, a transverse floor plate extending across said room, a lower compartment beneath said plate, engine-generator units in said room having the generators thereof disposed in said lower compartment, means forming air tunnels about each of said generators, individual air circulating means for drawing air through each of said tunnels and closed to the air in said lower compartment, and closed conduit means for drawing air from said lower compartment into the intakes of each of said engines.

38. In a submarine, an engine room, a transverse floor plate extending across said room and dividing said room into upper and lower compartments, engine-generator units in said room having the generators thereof disposed below said floor plate, means for supporting said units in position including means forming generator tunnels about each of said generators, individual air circulating means for drawing air through each of said tunnels and closed to the air below said floor plate, and means in each of said circulating means for controlling the temperature of the air circulated thereby.

39. In a submarine, a cylindrical hull section having transverse vertical bulkheads and defining an engine room, a plurality of engine-generator units in said room arranged in spaced transverse rows, a row of heat exchangers disposed between adjacent rows of said units, sea water supply conduits extending on opposite sides of said exchangers within the space between adjacent rows of said units, said conduits having inlets at opposite sides of said hull section, and a cross connection between said conduits, said heat exchangers providing for cooling of the engine-generator units.

40. In a submarine, a cylindrical hull section having transverse bulkheads at its ends defining an engine room, a plurality of engine-generator units in said room disposed in spaced transverse rows, a corresponding number of heat exchangers disposed in a row between adjacent rows of said units, alternate exchangers being connected to one row of units, a sea water connection for each alternate series of heat exchangers, cross-connecting means between said connections, and circulating pump means on each unit connected to the corresponding heat exchanger.

41. In a submarine, an inner cylindrical hull section defining therein an engine room, an outer hull section spaced from said inner hull section, a transverse floor plate extending across said engine room and dividing said room into two compartments, spaced transverse rows of engine-generator units in said room supported within the lower compartment and having the generators thereof disposed in said lower compartment, an air circulating system for each of said generators closed to the air in said lower compartment, and means for drawing air from the upper compartment into the lower compartment and thence through said floor plate into the intakes of each of said engines.

42. In a motor-propelled submarine, a substantially cylindrical hull section, transverse bulkheads extending vertically across said section to define an engine room, a transverse personnel deck separating said room into upper and lower compartments, a plurality of engine-generator units mounted in lateral and transverse alinement in said room, the generators of said units being disposed in said lower compartment, means for introducing air from said upper compartment into said lower compartment, intake means for the engines of said units communicating through said deck with said lower compartment, individual generator tunnels enclosing each of said generators, and individual air circulating means for each of said tunnels closed to the air in said lower compartment.

43. In a motor-propelled submarine, a hull section closed at its ends to define an engine room, a floor plate extending transversely across said room and forming upper and lower compartments therein, electric drive means in said room comprising a plurality of individual engine-generator units having the engines disposed above said floor plate and the generators disposed in vertical alinement therewith beneath said floor plate, means forming individual generator tunnels about each of said generators, individual air circulating means for each of said tunnels closed to the air in said lower compartment, and individual means for drawing air from beneath said floor plate to the intake of each of said engines.

44. In a submarine, an engine room comprising a longitudinally extending hull section closed at its ends, a first series of laterally spaced engine-generator units in said room, a second series of laterally spaced engine-generator units in said room, said two series of units being spaced apart and having corresponding ends of said units disposed adjacent each other, a transverse air trunk between said units, individual heat exchangers for each of said units disposed in said air trunk, and corresponding sea water suction conduits for supplying cooling water to the heat exchangers for each series of units.

45. In a submarine, an engine room comprising a longitudinally extending hull section closed at its ends, a first series of laterally spaced engine-generator units in said room, a second series of laterally spaced engine-generator units in said room, said two series of units being spaced apart and having a transverse air trunk disposed therebetween, individual heat exchangers for each of said units disposed in said air trunk, corresponding sea water suction conduits for supplying cooling water to the heat exchangers for each series of units, and individual means forming generator cooling tunnels for each of said units and communicating with said air trunk.

46. In a submarine boat, an engine room comprising a longitudinally extending hull section closed at its ends, a first series of laterally spaced engine-generator units, a second series of laterally spaced engine-generator units, said two series of units being spaced apart and having a transverse air trunk disposed therebetween, individual heat exchangers for each of said units disposed in said air trunk, corresponding sea water suction conduits for supplying cooling water to the heat exchangers for each series of units, and means for drawing air from said trunk through each of said tunnels and into the respective intakes of each of said engines of said units.

47. In a submarine, a substantially cylindrical hull section, spaced transverse bulkheads extending vertically through said section and defining an engine room therewith, a transverse floor plate extending across said room, a second transverse base plate spaced below said floor plate and extending parallel thereto, a plurality of engine-generator units disposed in said room, supporting means for said units mounted on said base plate and including means forming generator cooling tunnels, the generators of said units being disposed between said plates, means for conducting air from above said floor plate into the space between said plates, and means for drawing air from said space into the intakes of each of said engines.

48. In a submarine, a substantially cylindrical hull section, spaced transverse bulkheads extending vertically through said section and defining an engine room therewith, a transverse floor plate extending across said room, a second transverse base plate below said floor plate and extending parallel thereto, a plurality of engine-generator units disposed in said room, supporting means for said units mounted on said base plate and including means forming generator cooling tunnels, the generators of said units being disposed between said plates, and individual means for circulating air through each of said tunnels and closed to the air in the space between said plates.

49. In a submarine, a substantially cylindrical hull section, spaced transverse bulkheads extending vertically through said section and defining an engine room therewith, a transverse floor plate extending across said room, a second transverse base plate spaced below said floor plate and extending parallel thereto, a plurality of engine-generator units disposed in said room, supporting means for said units mounted on said base plate and including means forming generator cooling tunnels, the generators of said units being disposed between said plates, said units being disposed in spaced transverse rows, cooling means for each of said units including heat exchanger means disposed in the space between the transverse rows of said units, and sea water suction connections extending within the space between said units and between said plates for supplying sea water to said heat exchanger means.

LAWRENCE Y. SPEAR.
HUGO E. GRIESHABER.
ERNEST NIBBS.

CERTIFICATE OF CORRECTION.

Patent No. 2,019,025. October 29, 1935.

LAWRENCE Y. SPEAR, ET AL.

It is hereby certified that error appears in the printed specification of the above numbered patent requiring correction as follows: Page 9, first column, line 52, claim 2, after "said" first occurrence, insert the word floor; same column, line 66, claim 3, beginning with the word "means" strike out all to and including the syllable and comma "ber," in line 69; line 69, before "the" first occurrence, insert the word and; and in same line 69, strike out the word "and" and insert instead the words and comma means for delivering air from the upper portion of said hull section to the space beneath said floor member,; page 11, second column, line 43, claim 23, for "ond" read and; and page 12, first column, line 27, claim 25, for "generator" read generators; and that the said Letters Patent should be read with these corrections therein that the same may conform to the record of the case in the Patent Office.

Signed and sealed this 14th day of January, A. D. 1936.

Leslie Frazer (Seal) Acting Commissioner of Patents.